(12) United States Patent
Sasaki et al.

(10) Patent No.: US 7,600,424 B2
(45) Date of Patent: Oct. 13, 2009

(54) LIQUID CONDITION SENSING APPARATUS

(75) Inventors: Hisashi Sasaki, Aichi (JP); Shinichi Hayashi, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 323 days.

(21) Appl. No.: 11/478,589

(22) Filed: Jul. 3, 2006

(65) Prior Publication Data

US 2007/0000319 A1  Jan. 4, 2007

(30) Foreign Application Priority Data

Jul. 4, 2005 (JP) ............................. 2005-195087
May 15, 2006 (JP) ............................. 2006-135632

(51) Int. Cl.
G01F 23/26 (2006.01)

(52) U.S. Cl. .................................... 73/304 C

(58) Field of Classification Search ............... 73/304 C, 73/304 R, 54.01, 53.01, 61.42, 61.44, 114.55, 73/114.56, 1.02
See application file for complete search history.

(56) References Cited

U.S. PATENT DOCUMENTS

| | | | | |
|---|---|---|---|---|
| 4,064,455 A * | 12/1977 | Hopkins et al. | ............. | 324/663 |
| 4,646,070 A * | 2/1987 | Yasuhara et al. | ............. | 340/603 |
| 6,170,318 B1 * | 1/2001 | Lewis | ........................ | 73/23.34 |
| 6,443,006 B1 * | 9/2002 | Degrave | ................... | 73/304 C |
| 6,577,112 B2 * | 6/2003 | Lvovich et al. | ............. | 324/71.1 |
| 6,578,416 B1 * | 6/2003 | Vogel et al. | ............... | 73/304 C |
| 6,686,768 B2 * | 2/2004 | Comer | ........................ | 326/38 |
| 7,017,409 B2 * | 3/2006 | Zielinski et al. | ............ | 73/304 C |
| 7,043,402 B2 * | 5/2006 | Phillips et al. | .............. | 702/184 |
| 7,064,560 B2 * | 6/2006 | Yamamoto et al. | .......... | 324/663 |
| 7,129,715 B2 * | 10/2006 | Hayashi et al. | ............. | 324/685 |

FOREIGN PATENT DOCUMENTS

| | | |
|---|---|---|
| JP | 63-79016 A | 4/1988 |
| JP | 2003-110364 A | 4/2003 |
| JP | 2005-208038 A | 8/2005 |
| JP | 2005-221494 A | 8/2005 |

* cited by examiner

Primary Examiner—Hezron Williams
Assistant Examiner—Gunnar J Gissel
(74) Attorney, Agent, or Firm—Sughrue Mion, PLLC

(57) ABSTRACT

Capacitive liquid condition sensing apparatus includes a pair of a 1-1 electrode and a 1-2 electrode arranged to form a first capacitance; a pair of a 2-1 electrode and a 2-2 electrode arranged to form a second capacitance; a circuit board formed with a sensing circuit to sense the liquid condition such as a liquid level in accordance with the first and second capacitances; and 1-1, 1-2, 2-1 and 2-2 conductive paths connecting the 1-1, 1-2, 2-1 and 2-2 electrodes, respectively, to the sensing circuit, and including 1-1, 1-2, 2-1 and 2-2 conductive segments, respectively. The 1-1, 1-2, 2-1 and 2-2 conductive segments are arranged in a row, and extend side by side. The 1-1, 1-2, 2-1 and 2-2 conductive segments are arranged so that a first parasitic capacitance formed between the 1-1 conductive segment and the 1-2 conductive segment is equal to a second parasitic capacitance formed between the 2-1 conductive segment and the 2-2 conductive segment.

23 Claims, 13 Drawing Sheets

LIQUID CONDITION SENSING APPARATUS

BACKGROUND OF THE INVENTION

The present invention relates to liquid condition sensing apparatus for sensing a liquid condition such as a liquid level, and more specifically to capacitive liquid condition sensing apparatus.

A published Japanese patent application publication No. 63-79016 discloses a capacitive liquid level sensor for sensing a liquid level of gasoline or oil used in a motor vehicle. This sensor is arranged to be submerged at least partly in the liquid and to sense the level of the liquid. This liquid level sensor includes a reference electrode pair submerged invariably under the liquid, a measuring electrode pair to be submerged partly in the liquid, and a sensing circuit to measure the liquid level by using a ratio between a capacitance between the reference electrodes and a capacitance between the measuring electrodes.

By employing the reference electrodes in addition to the measuring electrode, this liquid level sensor can measure the liquid level accurately despite variation in the dielectric constant of the liquid.

SUMMARY OF THE INVENTION

However, the accuracy of the measurement could be decreased by a stray capacitance or parasitic capacitance formed between two current paths from the reference electrodes to the sensing circuit or between two current paths from the measuring electrodes to the sensing circuit. When the stray capacitance between the conduction paths of the reference electrodes is unequal from the stray capacitance between the two conduction paths of the measuring electrodes, the difference between these stray capacitances could exert adverse influence on the liquid level measurement accuracy.

It is therefore an object of the present invention to provide a capacitive liquid condition sensing apparatus for sensing a liquid condition more accurately.

According to the present invention, a capacitive liquid condition sensing apparatus to be submerged at least partly in a liquid, for sensing a liquid condition, comprises: a first electrode pair of a 1-1 electrode and a 1-2 electrode arranged to form a first capacitance varying in accordance with a condition of the liquid; a second electrode pair of a 2-1 electrode and a 2-2 electrode arranged to form a second capacitance varying in accordance with a condition of the liquid; a circuit board formed with a sensing circuit to monitor the first and second capacitances and to sense the liquid condition in accordance with the first and second capacitances; a 1-1 conductive path connecting the 1-1 electrode to the sensing circuit and including a 1-1 conductive segment; a 1-2 conductive path connecting the 1-2 electrode to the sensing circuit and including a 1-1 conductive segment; a 2-1 conductive path connecting the 2-1 electrode to the sensing circuit and including a 2-1 conductive segment; and a 2-2 conductive path connecting the 2-2 electrode to the sensing circuit and including a 2-2 conductive segment.

According to one aspect of the invention, the 1-1 conductive segment, the 1-2 conductive segment, the 2-1 conductive segment and the 2-2 conductive segment are arranged in a row, and extending side by side; and the 1-1 conductive segment, the 1-2 conductive segment, the 2-1 conductive segment and the 2-2 conductive segment are arranged so as to equalize a first parasitic capacitance formed between the 1-1 conductive segment and the 1-2 conductive segment and a second parasitic capacitance formed between the 2-1 conductive segment and the 2-2 conductive segment, to each other.

According to another aspect of the invention, the 1-1 conductive segment, the 1-2 conductive segment, the 2-1 conductive segment and the 2-2 conductive segment are arranged in a row, and extend side by side; and the 2-1 conductive segment extends between the 1-1 conductive segment and the 1-2 conductive segment, and the 1-2 conductive segment extends between the 2-1 conductive segment and the 1-2 conductive segment.

According to still another aspect of the invention, the 1-1 conductive path further includes a 1-1 terminal connected with the 1-1 electrode; the 1-2 conductive path further includes a 1-2 terminal connected with the 1-2 electrode; the 2-1 conductive path further includes a 2-1 terminal connected with the 2-1 electrode; the 2-2 conductive path further includes a 2-2 terminal connected with the 2-2 electrode; the liquid condition sensing apparatus further comprises a flexible electrode board which comprises: a vertical zone in which the 1-1, 1-2, 2-1 and 2-2 electrodes are formed; a horizontal zone in which the 1-1, 1-2, 2-1 and 2-2 terminals are formed; and a bent zone bent between the vertical zone and the horizontal zone; and the circuit board confronts the horizontal zone of the flexible electrode board.

The sensing circuit may comprise: a first grounding section to ground the 1-1 conductive path and the 1-2 conductive path; a second grounding section to ground the 2-1 conductive path and the 2-2 conductive path; and a capacitance measuring section to measure the first capacitance in a first measuring state in which at least one of the 1-1 conductive path and 1-2 conductive path is not grounded, and the 2-1 conductive path and the 2-2 conductive path are both grounded by the second grounding section, and to measure the second capacitance in a second measuring state in which at least one of the 2-1 conductive path and 2-2 conductive path is not grounded, and the 1-1 conductive path and the 1-2 conductive path are both grounded by the first grounding section.

DETAILED DESCRIPTION OF THE INVENTION

Figure 8:
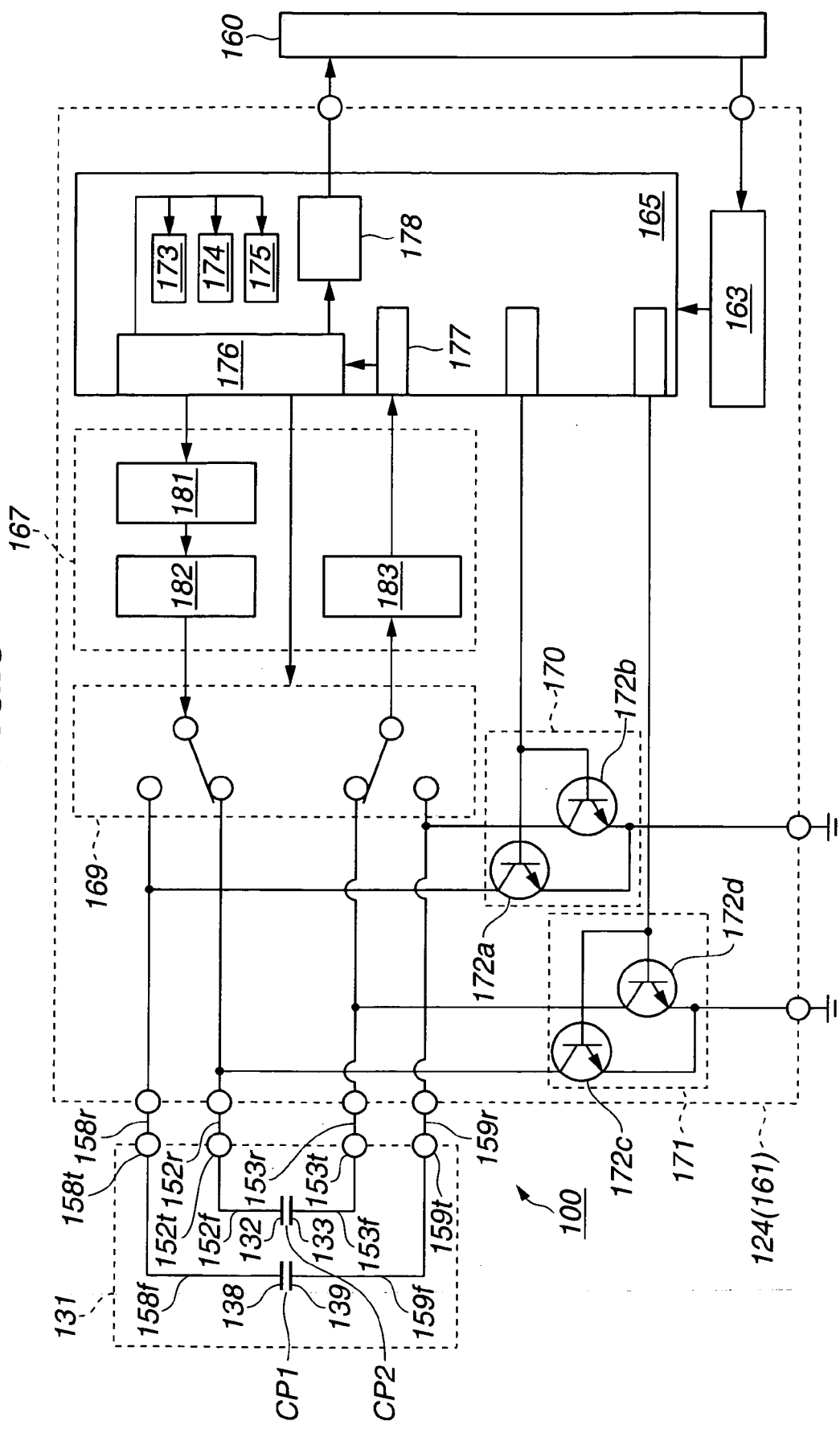
FIG. 8 is a diagram showing a circuit configuration of the liquid level sensor of FIG. 1.

FIGS. 1-5 show a liquid level sensor (serving as a capacitance type liquid condition sensing apparatus) 100, and FIG. 8 shows a circuit configuration of this level sensor schematically. Level sensor 100 is arranged to be immersed at least partly in a liquid and to sense the liquid level. In this example, the level sensor 100 is installed in a bottom LT of an oil tank for an internal combustion engine of a vehicle so that an axis AX of level sensor 100 extends upwards in a vertical direction V, to a forward (top) end 100s facing upwards, and arranged to sense the level of oil OL in the oil tank.

Figure 1:
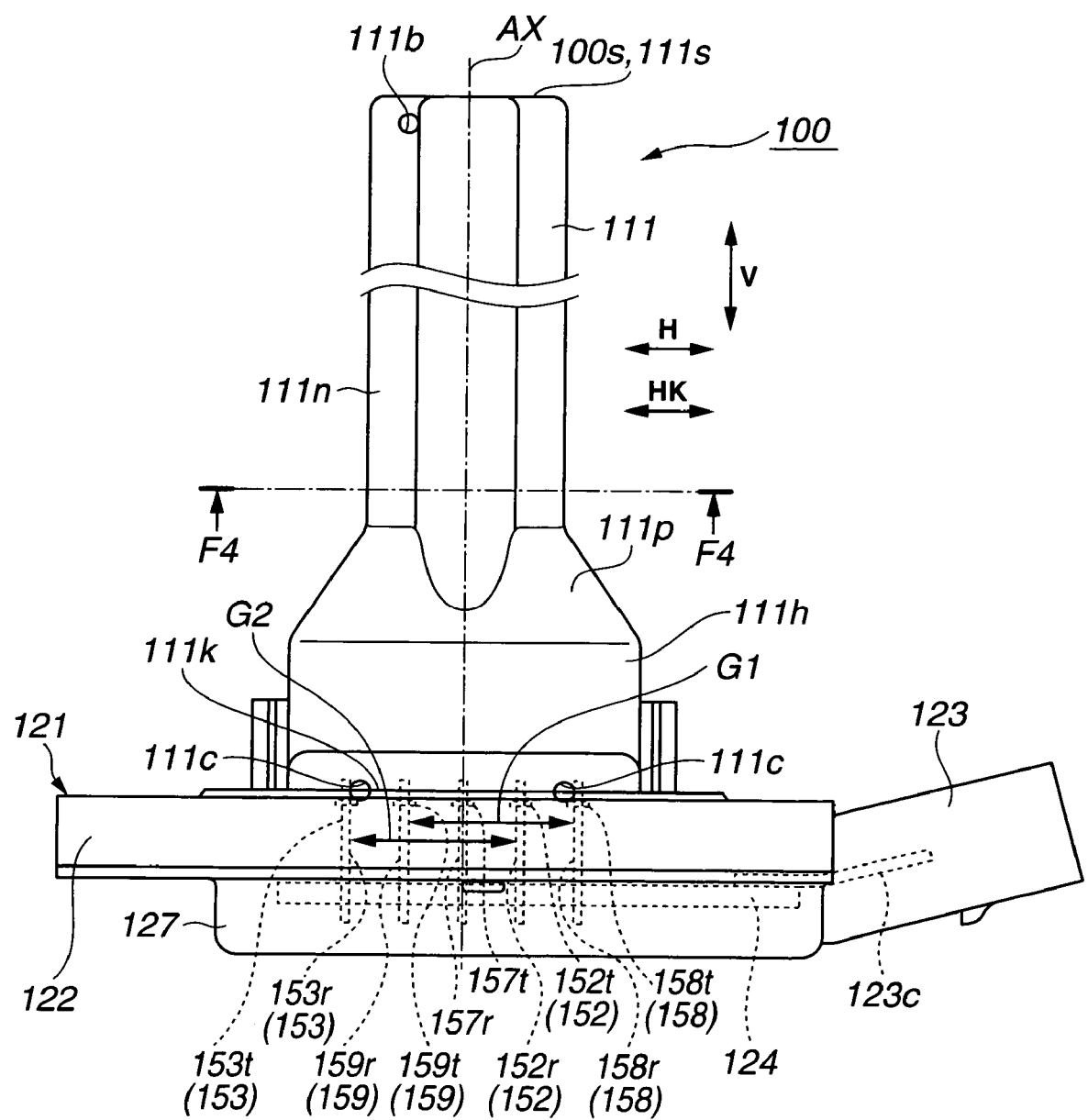
FIG. 1 is a front view of a liquid level sensor according to one embodiment of the present invention.
Figure 3:
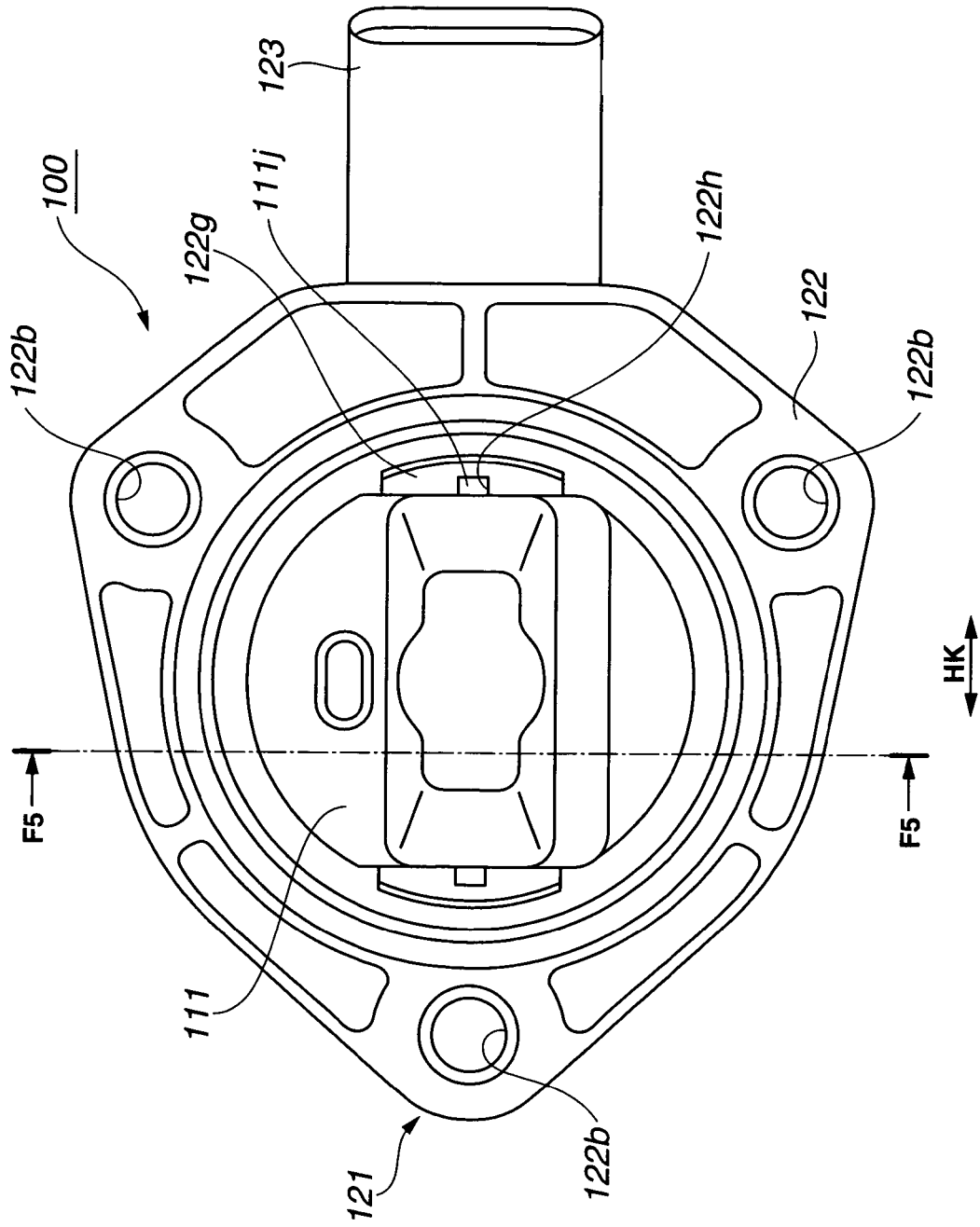
FIG. 3 is a plan view of the liquid level sensor of FIG. 1.
Figure 5:
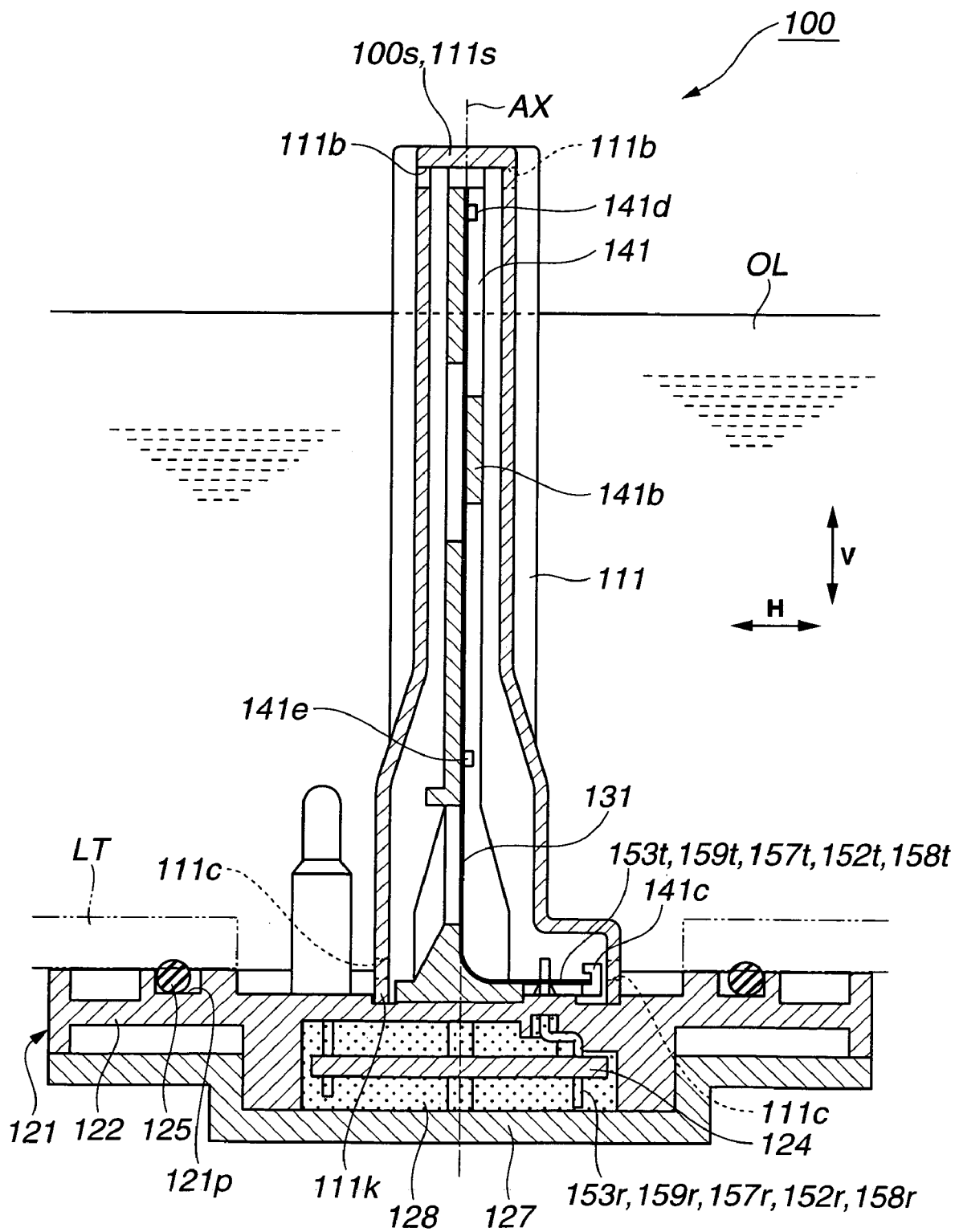
FIG. 5 is a sectional view of the liquid level sensor taken across a line F5-F5 shown in FIG. 3 in the assembled state in which the liquid level sensor is attached to an oil tank.

As shown in FIGS. 1 and 3, this liquid level sensor 100 includes a pedestal member 121 of resin; and a tubular sensor cap 111 projecting upwards from base member 121 and enclosing a film electrode board (or base plate) 131 (shown in FIG. 6A) carrying electrodes 132, 133, 138, 139 etc, and a frame member 141 (shown in FIG. 7) supporting the film electrode board 131 upright in the vertical direction V, as shown in FIG. 5. The pedestal member 121 supports the frame member 141 and sensor cap 111. As shown in FIG. 5, pedestal member 121 is fixed to the bottom LT of the oil tank inside the oil tank, so that the frame member 141 and sensor cap 111 are placed in the oil tank.

Figure 6A:
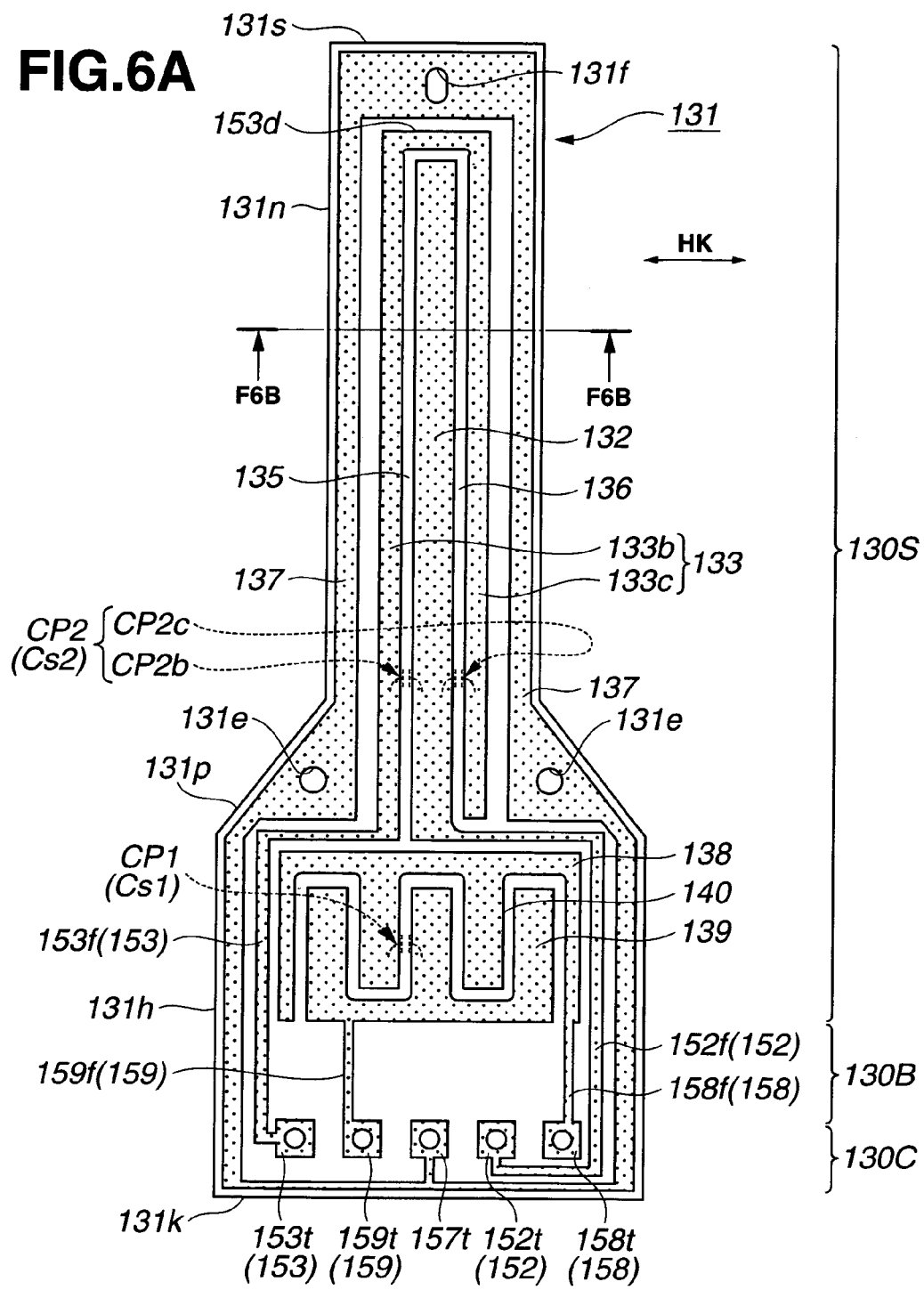
FIG. 6A is a plane view showing a film electrode board in the liquid level sensor of FIG. 1.

The film electrode board 131 of this example is flexible. As shown in FIG. 6A, film electrode board 131 extends longitudinally, in a longitudinal direction of the film electrode board 131 (upwards as viewed in FIG. 6A), from a base end (lower end) 131*k* to a forward end (upper end) 131*s*. Film electrode board 131 of this example includes a wider rectangular portion (lower portion) 131*h* extending from the base end 131 toward the forward end; a narrower rectangular portion (upper portion) 131*n* extending from the forward (upper) end 131*s* toward the base (lower) end 131*k*; and a tapered portion (intermediate portion) 131*p* of a trapezoidal shape which extends from the upper end of the wider rectangular portion 131*h* to the lower end of the narrower rectangular portion 131*n* and which tapers in width upwards from the upper end of the wider rectangular portion 131*h* to the lower end of the narrower rectangular portion 131*n*.

The film electrode board 131 of this example is a laminate including a resin film 131*b* of polyimide; a conductive layer 131*d* including electrodes 132, 133, 138 and 139 forming first and second capacitors CP1 and CP2 (CP2*b*, CP2*c*); and a resin film 131*c* of polyimide. Conductive layer 131*d* is interposed and sandwiched between the resin films 131*b* and 131*c*. Resin films 131*b* and 131*c* function to retain the position of conductive layer 131*d*, and to protect the conductive layer 131*d* against the oil OL and air to prevent conduction (or leakage) through oil OL, and to prevent corrosion by oil OL or air. In this example, conductive layer 131*d* is formed on the resin film or resin layer 131*b* and patterned as shown in FIG. 6A.

The conductive layer 131*d* of this example is made of copper foil. Conductive layer 131*d* is shaped or patterned to form a 2-1 electrode 132; a 2-2 electrode 133 (which, in this example, is composed of a 2-21 electrode 133*b* and a 2-22 electrode 133*c*); a guard electrode 137; a 1-1 electrode 138; and a 1-2 electrode 139. The 2-1 and 2-2 electrodes 132 and 133 serve as a measuring electrode pair; and the 1-1 and 1-2 electrodes 138 and 139 serve as a reference electrode pair.

The 2-1 electrode 132 of the measuring electrode pair is in the form of a long rectangle or a stripe, and extends longitudinally in the narrower rectangular portion 131*n* and the tapered portion 131*p* of film electrode board 131. The 2-1 electrode 132 is electrically connected, by a 2-1 electrode connection line 152*f*, with a 2-1 electrode terminal 152*t* which is connected with a 2-1 lead pin 152*r* as mentioned later, and which is shaped like a square. The 2-2 electrode 133 is formed in the narrower rectangular portion 131*n* and the tapered portion 131*p* of film electrode board 131 like the 2-1 electrode 132. The 2-2 electrode 133 includes a 2-21 electrode 133*b* and a 2-22 electrode 133*c* which are electrically connected with each other through an electrode connection line 153*d*. The 2-21 electrode 133*b* is shaped like a long rectangle or a stripe, and electrically connected, by a 2-2 electrode connection line 153*f*, with a 2-2 electrode terminal 153*t* which is connected with a 2-2 lead pin 153*r* as mentioned later, and which is shaped like a square.

The 2-1 electrode connection line 152*f* and 2-1 electrode terminal 152*t* are part of a 2-1 conductive path (or channel) 152 extending from the 2-1 electrode 132 to a sensing circuit 161. The 2-2 electrode connection line 153*f* and 2-2 electrode terminal 153*t* are part of a 2-2 conductive path (or channel) 153 extending from the 2-2 electrode 133 to the sensing circuit 161. The sensing circuit 161 is formed in a circuit board 124, as mentioned later.

The 2-1 electrode 132 is formed between the 2-21 electrode 133*b* and the 2-22 electrode 133*c* in the widthwise direction HK of the film electrode board 131. Between the 2-21 electrode 133*b* and the 2-1 electrode 132, there is formed a first gap 135 of a predetermined width extending in the longitudinal direction (AX) of film electrode base member 131. Accordingly, the 2-1 electrode 132 and 2-21 electrode 133*b* forms a capacitor CP2*b* across the first gap 135. Similarly, there is formed, between the 2-22 electrode 133*c* and the 2-1 electrode 132, a second gap 136 of a predetermined width extending in the longitudinal direction (AX) of film electrode board 131, and the 2-1 electrode 132 and 2-22 electrode 133*b* forms a capacitor CP2*c* across the second gap 136. Therefore, the 2-1 electrode 132 and 2-2 electrode 133 form a combined capacitor CP2 therebetween by combining the first and second capacitors CP2*b* and CP2*c*.

The 1-1 electrode 138 of the reference electrode pair is electrically connected, by a 1-1 electrode connection line 158*f*, with a 1-1 electrode terminal 158*t* shaped like a square. The 1-2 electrode 139 of the reference electrode pair is electrically connected, by a 1-2 electrode connection line 159*f*, with a 1-2 electrode terminal 159*t* shaped like a square.

The 1-1 electrode connection line 158*f* and 1-1 electrode terminal 158*t* are part of a 1-1 conductive path 158 extending from the 1-1 electrode 138 to the sensing circuit 161. The 1-2 electrode connection line 159*f* and 1-2 electrode terminal 159*t* are part of a 1-2 conductive path 159 extending from the 1-2 electrode 139 to the sensing circuit 161.

Each of the reference electrodes (1-1 electrode 138 and 1-2 electrode 139) is shaped like a comb, and both reference electrodes 138 and 139 are interdigitated and separated by a gap 140 of a predetermined width. The reference electrode pair 138 and 139 is located, in the longitudinal direction of the film electrode board 131, between the measuring electrode pair 132 and 133 and the base end 131*k* of film electrode board 131. The 1-1 reference electrode 138 and 1-2 reference electrode 139 form a capacitor CP1 across the gap 140. The measuring electrode pair 132 and 133 extend between the forward end 131s of electrode board 131 and the reference electrode pair 138 and 139.

A guard electrode 137 extends in a marginal region of the film electrode board 131, and surrounds the electrodes 132, 133, 138 and 139, the electrode connection lines 152f, 153f, 158f and 159f, and the electrode terminals 152t, 153t, 158t and 159t. Guard electrode 137 is electrically connected with a guard electrode terminal 157t shaped like a square and located near the base end 131k. As shown in FIG. 6A, each of the 2-1 electrode terminal 152t, 2-2 electrode terminal 153t, 1-1 electrode terminal 158t; 1-2 electrode terminal 159t and guard electrode terminal 157t is formed with a circular through hole for receiving a corresponding one of lead pins as mentioned later.

An upper through hole 131f is formed in film electrode board 131, near the forward (or upper) end 131s at the middle in the widthwise direction HK. This upper through hole 131 is shaped like an ellipse elongated in the longitudinal direction of electrode board 131. Upper through hole 131f is used to position the film electrode board 131 in an operation of fixing the film electrode board 131 to the frame member 141, and to retain the upper portion of film electrode board 131 near the forward end 131s so as to prevent the upper portion from rising. Furthermore, in the tapered portion 131p of film electrode board 131, there are formed two circular through holes 131e for positioning the film electrode board 131.

Figure 6B:
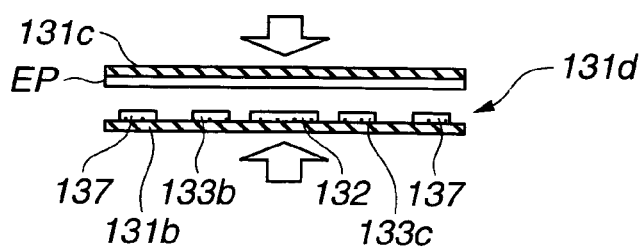
FIG. 6B is a sectional view taken across a line F6B-F6B shown in FIG. 6A for illustrating a process of producing the film electrode board.

As shown in FIGS. 6A and 6B, the electrodes 132, 133, 137, 138 and 139, the electrode connection lines 152f, 153f, 158f and 159f and the electrode terminals 152t, 153t, 157t, 158t and 159t are all formed from a single conductive layer on the same substrate layer (such as layer 131b or 131c) in the same film electrode board 131.

The 2-1 electrode terminal 152t is located between the 1-1 electrode terminal 158t and 1-2 electrode terminal 159t in the widthwise direction HK. The 1-2 electrode terminal 159t is located between the 2-1 electrode terminal 152t and 2-2 electrode terminal 153t in the widthwise direction HK. As shown in FIG. 6A, the five substantially square electrode terminals 153t, 159t, 157t, 152t and 158t are arranged in a row in the order of mention in the widthwise direction near the base end 131k.

To achieve the arrangement of the terminals, the 2-1 electrode connection line 152f is extended around the 1-1 electrode terminal 158t. The 2-1 electrode connection line 152f includes a first segment or portion extending in the widthwise direction HK to a segment end from the lower end of the 2-1 electrode 132; a second (longitudinally extending) segment or portion extending downwards, in the longitudinal direction of electrode board 131, from the segment end of the first segment, between the guard electrode 137 and the reference electrode pair 138 and 139; and a third (laterally extending) segment serving as a roundabout portion and extending in the widthwise direction HK from a lower end of the second segment, through a region between the 1-1 terminal 158t and the base end 131k, to the terminal 152t. The third segment is located on the lower side of the 1-1 electrode terminal 158t as viewed in FIG. 6A. By extending the 2-1 electrode connection line 152f in this way to detour the 1-1 terminal 158t, it is possible to arrange the 1-1 electrode terminal 158t, 2-1 electrode terminal 152t, 1-2 electrode terminal 159t and 2-2 electrode terminal 153t in a row in this order while the electrodes, connection lines and terminals are formed by patterning a single layer.

The flexible film electrode base board 131 is divided into three zones or regions 130S, 130B and 130C, as shown in FIG. 6A. The first zone 130S is a measuring zone including the narrower rectangular portion 131n, tapered portion 131p and an upper-half of the wider rectangular portion 131h. The measuring and reference electrodes 132, 133, 138 and 139 are formed in the measuring zone 130S. The third zone 130C is a connection zone including a lower part of the wider rectangular portion 131h near the base end 131k. The electrode terminals 152t, 153t, 158t, 159t and 157t are formed in the connection zone 130C. The second zone 130B is a bending zone or bent zone extending between the measuring zone 130S and connection zone 130C. The bending zone 130B is a zone to assume a curved form or bend as shown in FIG. 5.

Figure 7:
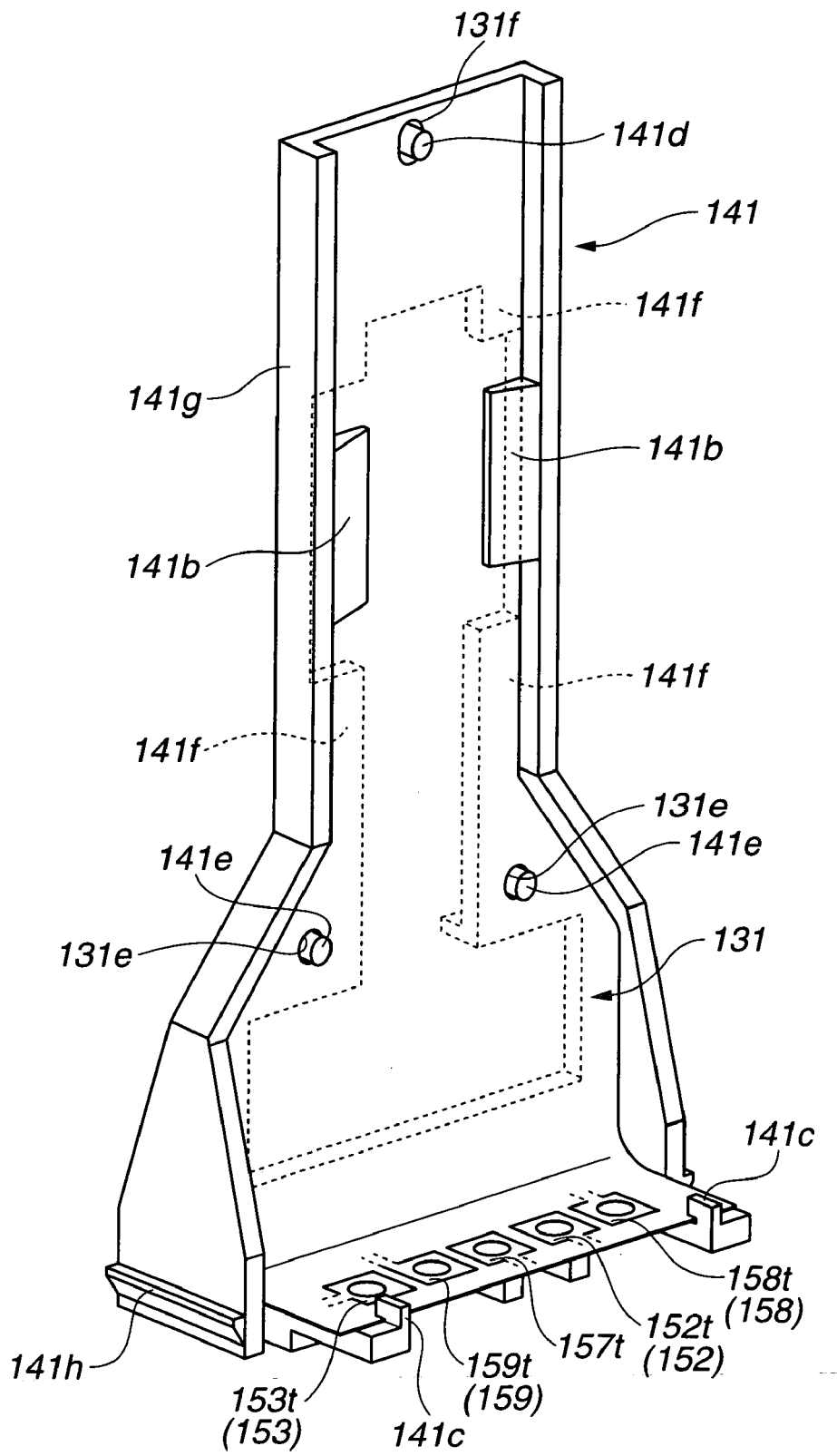
FIG. 7 is a perspective view showing a frame member supporting the film electrode board shown in FIGS. 6A and 6B.

The frame member or support member 141 is best shown in FIG. 7, in the state in which film electrode board 131 is installed in frame member 141. Frame member 141 is made of nylon 66. Frame member 141 is shaped like a frame to support the rim of the measuring zone 130S of film electrode board 131. Frame member 141 includes left and right side portions 141g serving as upright members of the frame; left and right inward projections 141b projecting inwards toward each other from the left and right side portions 141g, respectively; an upper support pin 141d, left and right intermediate support pins 141e and left and right lower support portions 141c.

Frame member 141 further includes a support wall 141f which extends between the left and right side portions 141g, and which is formed with an opening to bare the measuring electrode pair of 2-1 electrode 132 and 2-2 electrode 133, and the reference electrode pair of 1-1 electrode 138 and 1-2 electrode 139. The frame member 141 is designed to support the film electrode board 131 with the support wall 141f abutting on the rear surface of the film electrode board 131, and the inward projections 141b abutting on part of the front surface of film electrode base board 131 so that film electrode base board 131 is interposed in the thickness direction between the support wall 141f and the inward projections 141b. The upper support pin 141d and left and right support pins 141e of frame member 141 are inserted, respectively, through the upper through hole 131f and intermediate through holes 131e, and joined by ultrasonic bonding. The lower support portions 141c grip the base end 131k of film electrode-base board 131. The film electrode board 131 is securely supported by the frame member 141 in this way.

In the assembled state in which the level sensor 100 is fixed to the oil tank bottom LT, the measuring zone 130S of film electrode base board 131 stands upright so that the measuring zone 130S is substantially flat and substantially parallel to the vertical direction V, as shown in FIGS. 5 and 7. On the other hand, the connection zone 130C of base board 131 is placed substantially horizontal in parallel to the horizontally placed circuit board 124, and the bending zone 130B is bent so as to form a 90° bend between the vertical measuring zone 130S and the horizontal connection zone 130C.

In this way, the flexible film electrode board 131 is bent in the L-shaped form with the measuring zone 130S extending in the vertical direction V and the connection zone 130C extending in the horizontal direction H, and the connection zone 130C having the electrode terminals is placed horizontally just above the circuit board 124. Therefore, the electrical connection between the electrode terminals with circuit board 124 is easy and secure. Moreover, it is possible to decrease the height of level sensor 100 because the circuit board 124 and connection zone 130C are horizontal. It is further possible to decrease the vertical dimension of the lower portion of level sensor 100 under the measuring zone 130S or under the measuring and reference electrodes. Therefore, level sensor can sense the oil level and the dielectric constant properly even when the oil level is low. Since the connection portion 130C can be readily bent in the horizontal posture, the flexible film electrode base board 131 facilitates the assembly operation while the electrodes, connection lines and terminals are formed in the same base board 131.

The sensor cap 111 is shown in FIGS. 1, 3, 4 and 5. Sensor cap 111 is made of dielectric material. In this example, sensor cap 111 is made of nylon 66. Sensor cap 111 is placed upright so that the longitudinal axis AX extends in the vertical direction V. Sensor cap 111 is tubular, and extends from a base (lower) end 111k which is open, to a forward (upper) end 111s which is closed, as shown in FIG. 5. Sensor cap 111 includes a wider tube portion 111h which is wider in the widthwise direction HK and which extends from the base end 111k toward the forward end; a narrower tube portion 111n which is narrower in the widthwise direction HK than the wider tube portion 111h and which extends from the forward (upper) end 111s toward the base end 111k; and a tapered tube portion 111p formed between the wider and narrower tube portions 111h and 111n.

Figure 4:
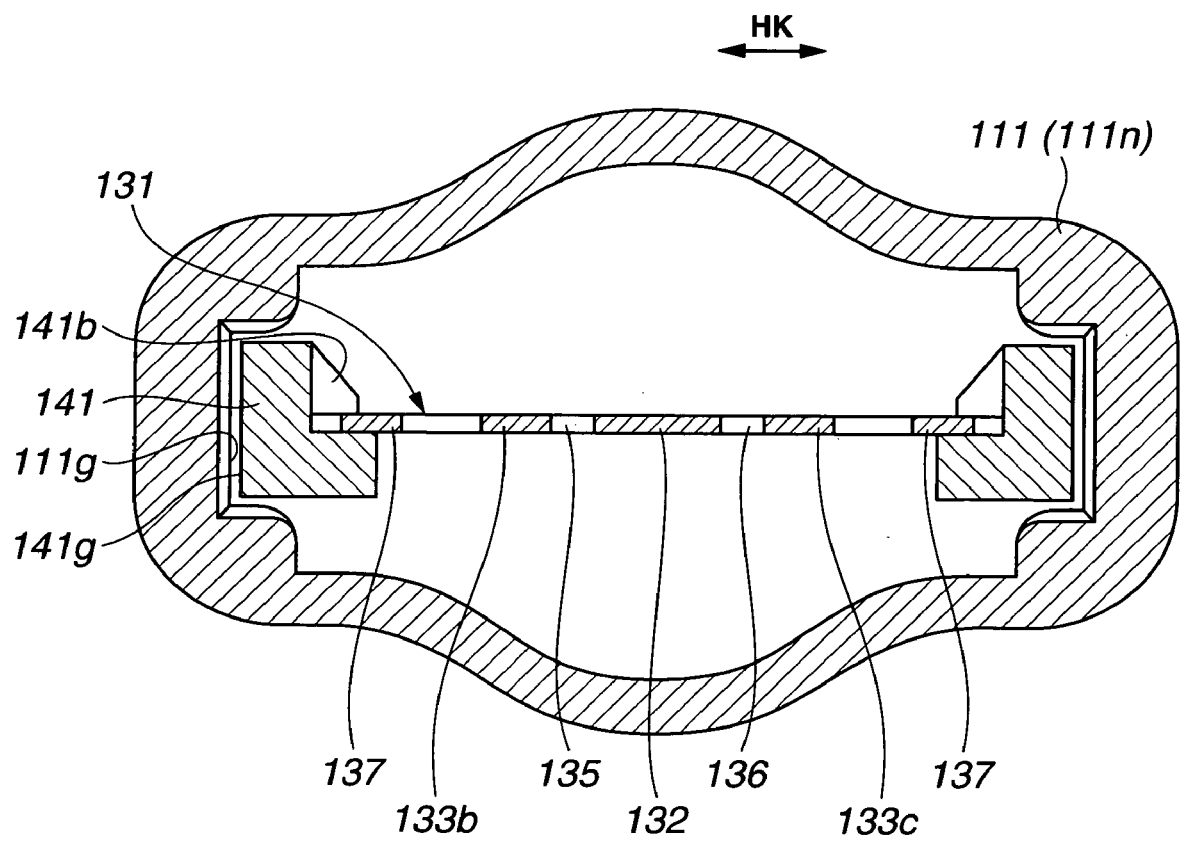
FIG. 4 is a sectional view of the liquid level sensor taken across a line F4-F4 shown in FIG. 1.

As shown in FIG. 4, guide grooves 111g are formed inside the narrower tube portion 111n of sensor cap 111. In the sensor cap 111, guide grooves 111g extends in the longitudinal direction AX on both sides, and confront each other in the widthwise direction HK. On each side, the side portion 141g of frame member 141 is fit in the guide groove 111g of sensor cap 111. As shown in FIGS. 1 and 5, in the lower-portion of sensor cap 111 near the base end 111k, there are formed a plurality of lower communication holes 111c for allowing the oil OL to flow between the inside and outside of sensor cap 111. In an upper portion of sensor cap 111 near the forward end 111s, there are formed a plurality of upper communication holes 111b for air release.

The pedestal (or base) member 121 is shown in FIGS. 1, 3 and 5. Pedestal member 121 is adapted to be fixed to the bottom LT of the oil tank and to support the sensor cap 111. Pedestal member 121 includes a main portion 122; a connector portion 123 including a connector terminal 123c for connection to an external device; and the circuit board 124 interposed between the connector terminal 123c, and the electrode terminals 153t, 159t, 157t, 152t and 158t. The sensing circuit 161 is formed in the circuit board 124. Circuit board 124 is installed in the main portion 122 of pedestal member 121. Circuit board 124 is enclosed and embedded in a filling member 128 of resin, as shown in FIG. 5. A metal cover 127 is fixed to the lower side of pedestal member 121 to cover the filing member 128.

As shown in FIG. 3, the base main portion 122 includes fastener holes or screw holes 122b for receiving screw fasteners for fixing the main portion 122 to the bottom LT of the oil tank; and guide portions 122g formed, respectively, with guide grooves 122h confronting each other in the widthwise direction and holding the sensor cap 111. Sensor cap 111 is supported by pedestal member 121 in the state in which outward projections 111j of sensor cap 111 are fit, respectively, in the guide grooves 122h of pedestal member 121.

As shown in FIGS. 1 and 5, the 2-1 electrode terminal 152t is electrically connected with circuit board 124 by the 2-1 lead pin 152r. The 2-2 electrode terminal 153t is electrically connected with circuit board 124 by the 2-2 lead pin 153r. The guard electrode terminal 157t is electrically connected with circuit board 124 by a guard lead pin 157r. The 1-1 electrode terminal 158t is electrically connected with circuit board 124 by the 1-1 lead pin 158r. The 1-2 electrode terminal 159t is electrically connected with circuit board 124 by the 1-2 lead pin 159r. The lead pins 152r, 153r, 157r, 158r and 159r are inserted, respectively, in the center holes of the electrode terminals 152t, 153t, 157t, 1587 and 159t, and fixed by soldering. Similarly, circuit board 124 is connected with these lead pins by soldering.

The 2-1 lead pin 152r is a part of a 2-1 conductive path 152 extending from the 2-1 electrode 132 to the sensing circuit 161 formed in circuit board 124, and 2-1 lead pin 152r corresponds to a 2-1 conductive segment of the 2-1 conductive path 152. The 2-2 lead pin 153r is a part of a 2-2 conductive path 153 extending from the 2-2 electrode 133 to the sensing circuit 161 formed in circuit board 124, and 2-2 lead pin 153r corresponds to a 2-2 conductive segment of the 2-2 conductive path 153. The 1-1 lead pin 158r is a part of a 1-1 conductive path 158 extending from the 1-1 electrode 138 to the sensing circuit 161 formed in circuit board 124, and 1-1 lead pin 158r corresponds to a 1-1 segment of the 1-1 conductive path 158. The 1-2 lead pin 159r is a part of a 1-2 conductive path 159 extending from the 1-2 electrode 139 to the sensing circuit 161 formed in circuit board 124, and 1-2 lead pin 159r corresponds to a 1-2 segment of the 1-2 conductive path 159.

Figure 2:
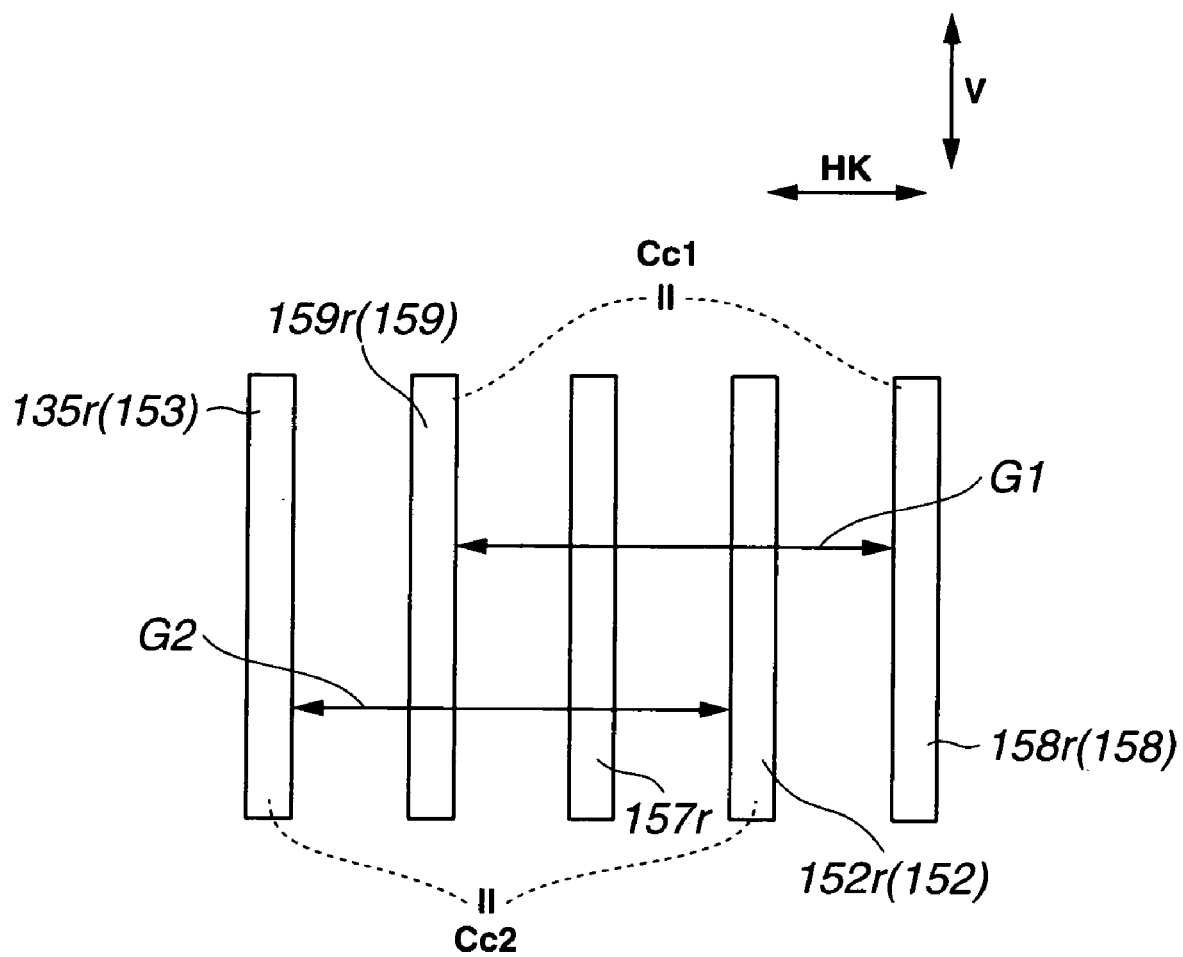
FIG. 2 is a view for illustrating an arrangement of lead pins in the liquid level sensor of FIG. 1.

These lead pins 152r, 153r, 158r and 159r are identical in shape and size. As shown in FIG. 2, lead pins 152r, 153r, 158r and 159r are straight, congruent with one another, and parallel to each other. The lower ends of these lead pins are aligned in a line extending in the widthwise direction HK, and the upper ends are aligned in a line extending in the widthwise direction HK. These lead pins 152r, 153r, 158r and 159r are enclosed by the film electrode board 131, circuit board 124 and filling member 128. Each of the resin materials of film electrode board 131, circuit board 124 and filling member 128 has a dielectric constant greater than the dielectric constant of air. In this example, the dielectric constant $\epsilon r$ of each of the resin materials of film electrode board 131, circuit board 124 and filling member 128 is in a range of $\epsilon r$=2.5~3.5. Therefore, a first parasitic capacitance Cc1 formed between the 1-1 lead pin 158r and 1-2 lead pin 159r as shown in FIG. 2, and a second parasitic capacitance Cc2 formed between the 2-1 lead pin 152r and 2-2 lead pin 153r are liable to become greater.

In this embodiment, however, the 1-1, 1-2, 2-1 and 2-2 lead pins are-arranged so that a first gap or distance G1 between the 1-1 lead pin 158r and 1-2 lead pin 159r and a second gap (or distance) G2 between the 2-1 lead pin 152r and 2-2 lead pin 153r are equal to each other. Therefore, the first parasitic capacitance Cc1 formed between the 1-1 lead pin 158r and 1-2 lead pin 159r as shown in FIG. 2, and a second parasitic capacitance Cc2 formed between the 2-1 lead pin 152r and 2-2 lead pin 153r are made equal to each other. By using a ratio of the first and second parasitic capacitances Cc1 and Cc2, therefore, it is possible to reduce adverse influence from the parasitic capacitances effectively and to sense the liquid level accurately.

Moreover, these lead pins 152r, 153r, 158r and 159r are compactly arranged in a row so that these lead pins are influenced equally by the surroundings, and the first and second parasitic capacitances are varied equally by a change in a condition of the surroundings such as a temperature (e.g. the temperature of oil OL). Therefore, the liquid condition sensing apparatus can sense the liquid level more accurately by using the ratio between the first and second capacitances Cs1 and Cs2, and reduce or eliminate the influence from a change in the surrounding condition.

In this embodiment, the lead pins 152r, 153r, 158r and 159r are arranged alternately. In this example, as shown in FIG. 2, the 2-1 lead pin 152r is located between the 1-1 and 1-2 lead pins 158r and 159r; and the 1-2 lead pin 159r is located between the 2-1 lead pin 152r and 2-2 lead pin 153r.

Such an alternating arrangement of the lead pins makes it possible to increase the distance (G1) between the 1-1 and 1-2 lead pins 158r and 159r, and the distance (G2) between the 2-1 and 2-2 lead pins 152r and 153r, without increasing the overall area occupied by these lead pins. Therefore, the liquid level sensor can decrease the parasitic capacitances Cc1 and Cc2, and further reduce the influence by the parasitic capacitors Cc1 and Cc2 on the measurement.

As show in FIG. 5, the oil level sensor 100 is fixed liquid-tightly to the bottom LT of the oil tank, with the interposition of a ring packing 125 received in a packing groove 121p of pedestal member 121, by screw fasteners inserted through the fastener holes 122b of pedestal member 121 shown in FIG. 3 and screwed, respectively, into internally threaded screw holes of the oil tank bottom LT. The sensor cap 111 extends upwards into the oil tank from the tank bottom LT so that the axis line AX of the level sensor 100 extends in the vertical direction V, as shown in FIG. 5.

The level sensor 100 is connected with an electronic control unit (ECU) 160 shown in FIG. 8, and arranged to supply information on the liquid level to ECU 160. ECU 160 performs an oil level warning process to signal the presence of an abnormal condition in the liquid level when the oil level sensed by level sensor 100 is out of a normal range. Furthermore, ECU 160 performs various control operations to control the internal combustion engine of the vehicle. For example, ECU 160 performs an ignition timing control process of controlling the ignition timing of the engine, and a process of detecting abnormal combustion such as knocking.

An ac voltage is applied between the 2-1 and 2-2 electrode terminals 152t and 153t through the connector terminal 123c, circuit board 124, and the 2-1 and 2-2 lead pins 152r and 153r of liquid level sensor 100, from ECU 160. By the application of the ac voltage, there are produced, in a section in the horizontal direction H (perpendicular to the vertical direction V) of the tube portion 111n of liquid level sensor 100, electric flux lines between the 2-1 and 2-21 electrodes 132 and 133b, and between the 2-1 and 2-22 electrodes 132 and 133c. The second capacitance Cs2 that is the capacitance of the capacitor CP2 resulting from the addition of the capacitor CP2b formed between the 2-1 and 2-21 electrodes 132 and 133b and the capacitor CP2c formed between the 2-1 and 2-22 electrodes 132 and 133c is varied by the dielectric constant in the space through which the electric flux lines pass.

When the liquid level sensor 100 is partly submerged in the oil OL, the capacitance per unit length in the vertical direction V differs between the submerged portion of the measuring electrodes under the oil level and the nonsubmerged portion of the measuring electrodes exposed to the air. Therefore, the second capacitance Cs2 of capacitor CP2 is varied in dependence on the proportion of the submerged portion of the measuring electrodes in the vertical direction. Because there is a certain relationship between the capacitance Cs2 of capacitor CP2 formed between the measuring electrodes 132 and 133 and the percentage of the submerged portion in the vertical direction, it is possible to determine the proportion of the submerged portion (or the depth of the submerged portion) of the measuring electrodes from the second capacitance Cs2. Thus, the measuring electrode pair of liquid level sensor 100 makes it possible to measure the liquid level of the oil OL only from the second capacitance Cs2.

However, the properties of the oil vary with time by various factors such as aging and heat. Moreover, the dielectric constant can be changed by replenishment of an oil of a different kind. Such a change in the properties of the oil influences the relationship between the second capacitance Cs2 and the oil level, and hence deteriorates the accuracy of the liquid level measurement.

Accordingly, the liquid level sensor 100 of this embodiment is further provided with the reference electrode pair of the 1-1 and 1-2 electrodes 138 and 139, in addition to the measuring electrode pair of the 2-1 and 2-2 electrodes 132 and 133 (133b and 133c). The reference electrode pair of 1-1 and 1-2 electrodes 138 and 139 is located below the measuring electrode pair at such a position that the 1-1 and 1-2 electrodes 138 and 139 are always submerged entirely in the oil. The liquid level sensing system of this embodiment is arranged to determine a current value of the dielectric constant of the oil by measuring the first capacitance Cs1 of the first capacitor CP1 formed between the 1-1 and 1-2 electrodes 138 and 139, and to modify the second capacitance Cs2 of the second capacitor CS2 measured by the 2-1 and 2-2 electrodes 132 and 133 by using the dielectric constant to improve the accuracy of the liquid level measurement.

As shown in FIG. 8, the sensing circuit 161 formed in circuit board 124 of liquid level sensor 100 includes a power supply circuit 163, a microcomputer 165, a signal output/input circuit 167, a switching circuit 169, a first grounding circuit or section 170, and a second grounding circuit or section 171. Power is supplied from ECU 160 to the sensing circuit 161, and the power supply circuit 163 supplies power (the voltage is 5 V) to various sections in sensing circuit 161 after removing high frequency component from the waveform of the power supplied from ECU 160.

Microcomputer 165 includes CPU 173, ROM 174, RAM 175, I/O port 176 and A/D conversion port 177, and sense the liquid level of oil OL in accordance with the first and second capacitances Cs1 and Cs2 by performing an oil level sensing control process as explained later. Microcomputer 165 serves as a first capacitance measuring means for measuring Cs1, and a second capacitance measuring means for measuring Cs2. Microcomputer 165 further includes a PWM output section 178 which delivers, to ECU 160, a PWM signal containing information on the liquid level.

The signal output/input circuit 167 includes a voltage dividing circuit 181, a low-pass filter 182, and a current-voltage converting circuit 183. The voltage dividing circuit 181 includes a plurality of resistance elements, and provides a desired fraction of the supply voltage (5V) from power supply circuit 163. The voltage dividing circuit 181 is arranged to alter the output voltage for the low-pass filter 182 by changing the connection state of the resistance elements in response to a command signal from microcomputer 165. By varying the output voltage stepwise, the voltage dividing circuit 181 produces an approximately sinusoidal waveform varying with step changes.

The low-pass filter 182 receives the stepwise sinusoidal waveform from voltage dividing circuit 181, and delivers a low-frequency component. By so doing, low-pass filter 182 produces a smooth sinusoidal waveform from the stepwise sinusoidal waveform, and delivers the smoothed waveform to the switching circuit 169. The current to voltage converting circuit 183 receives, from the first electrode pair of 1-1 and 1-2 electrodes 138 and 139 or the second electrode pair of 2-1 and 2-2 electrodes 132 and 133, the current waveform signal (after-passage signal); converts the current waveform signal into a voltage waveform signal; and supplies the voltage waveform signal to microcomputer 165. A Published Japanese Patent Application Kokai Publication No. 2003-110364 discloses circuits which can be used as the voltage dividing circuit 181 and low-pass filter 182.

The switching circuit 169 is composed of analog switches and arranged to connect the signal output/input circuit 167 selectively with the reference electrode pair of 1-1 and 1-2 electrodes 138 and 139 or the measuring electrode pair of 2-1 and 2-2 electrodes 132 and 133 in response to a command signal (switch timing signal) from microcomputer 165. The output/input circuit 167 delivers the sinusoidal signal, through switching circuit 169, to the reference electrode pair or the measuring electrode pair, to provide a measurement signal, and the current-to-voltage conversion circuit 183 receives the measurement signal obtained by the passage of the sinusoidal signal through the reference electrode pair (CP1) or the measuring electrode pair (CP2).

The first grounding circuit 170 includes two switching elements (switching transistors) 172a and 172b, and sets the reference electrodes 138 and 139 selectively in a ground state in which the reference electrodes are connected to a ground line, and a non-ground state in which the reference electrodes are disconnected from the ground line, in response to a command signal (shield changeover timing signal) from microcomputer 165. The second grounding circuit 171 includes two switching elements (switching transistors) 172c and 172d, and sets the measuring electrodes 132 and 133 selectively in a ground state in which the measuring electrodes are connected to the ground line, and a non-ground state in which the measuring electrodes are disconnected from the ground line in response to a command signal (shield changeover timing signal) from microcomputer 165.

Figure 9:
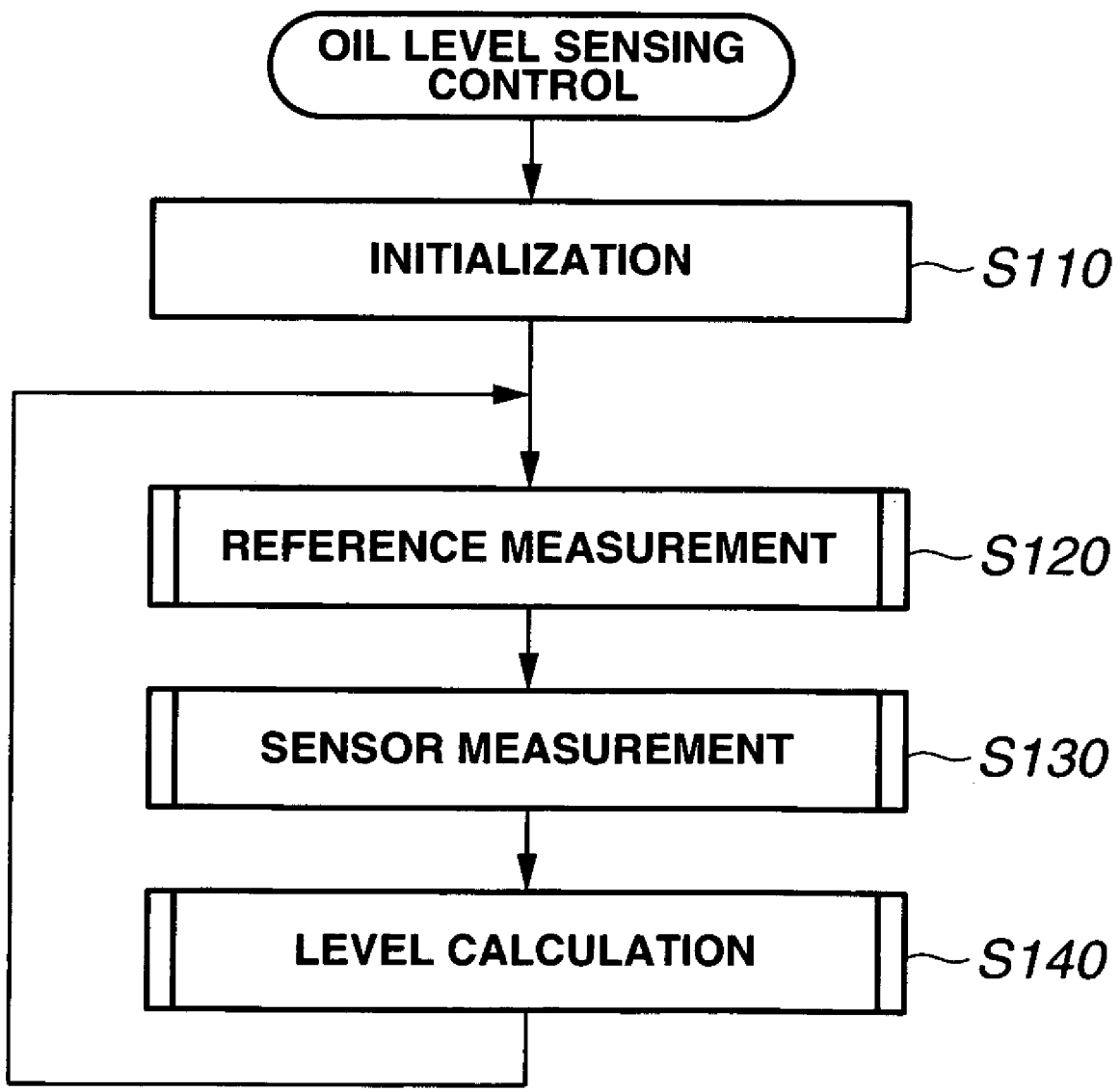
FIG. 9 is a flowchart of an oil level sensing control process performed by a sensing circuit of the oil level sensor of FIG. 1.

FIG. 9 shows the oil level sensing control process performed by microcomputer 165. This control process is started when the internal combustion engine is started. A first step S110 is for initialization to initialize RAM 175, I/O port 176 and a timer register.

Figure 10:
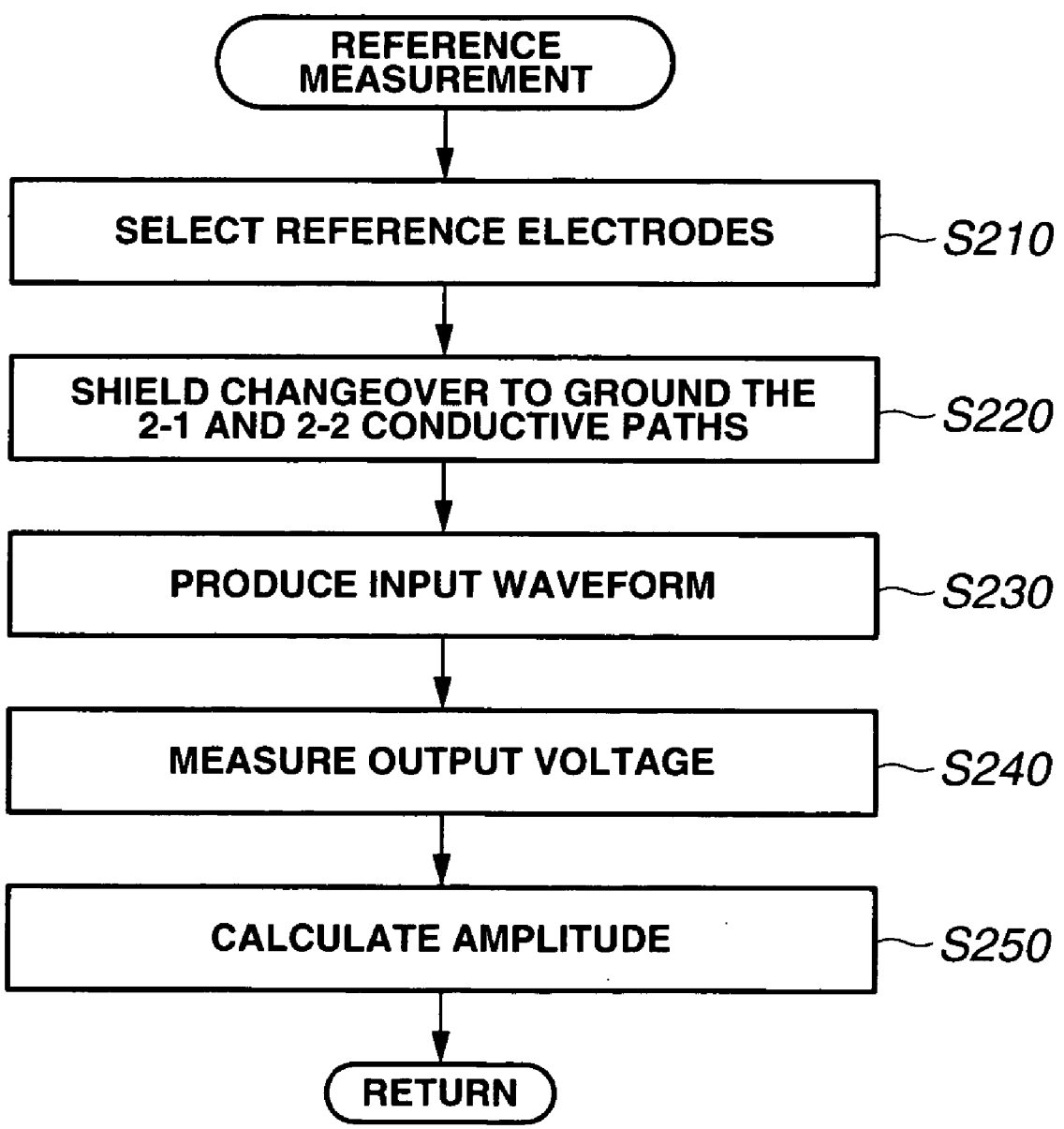
FIG. 10 is a flowchart showing a reference measurement process performed at a step S120 of FIG. 9.

At a step S120 following S110, microcomputer 165 performs a reference measurement process shown in FIG. 10. At a first step S210 of the reference measurement process of FIG. 10, microcomputer 165 produces the switch timing signal to select the reference electrode pair of 1-1 and 1-2 electrodes 138 and 139 as the destination of the connection, and thereby drives the switching circuit 169 to connect the signal output/input circuit 167 with the reference electrode pair.

At a step S220, microcomputer 165 produces the shield changeover timing signal to turn on the second grounding circuit 171, and thereby sets the second grounding circuit 171 to an on state to connect the 2-1 connection path 152 and 2-2 connection, path 153 to the ground line. Moreover, microcomputer 165 produces the shield changeover timing signal to turn off the first grounding circuit 170, and thereby sets the first grounding circuit 170 to an off state to disconnect the reference electrodes 138 and 139 from the ground line.

Therefore, the 2-1 lead pin 152r located between the 1-1 and 1-2 lead pins 158r and 159r, as well as the 2-2 lead pin 153r, serves as a ground electrode, and thereby functions to reduce the first parasitic capacitance Cc1 formed between the 1-1 and 1-2 lead pins 158r and 159r significantly. As a result, the liquid level sensing system can sense the first capacitance Cs1 between the 1-1 and 1-2 electrodes 138 and 139 accurately by reducing the influence of the first parasitic capacitance Cc1 constituting a large part of the parasitic capacitance between the 1-1 conductive path 158 and the 1-2 conductive path 159.

At a step S230, microcomputer 165 delivers an input waveform generation command signal to the output/input circuit 167, drives the voltage dividing circuit 181, and causes the low-pass filter 182 to produce the stepwise sinusoidal signal. By so doing, the output/input circuit 167 (voltage dividing circuit 181 and low-pass filter 182) delivers the measurement signal (sinusoidal signal) to the 1-1 electrode 138 of the reference electrode pair through the switching circuit 169.

At a step S240, microcomputer 165 performs an operation to receive a signal outputted from the output/input circuit 167 (the current-to-voltage converting circuit 183). The signal received from the output/input circuit 167 is an after-passage signal (the reference after-passage signal) produced by causing the measurement signal (sinusoidal signal) to pass through the capacitor CP1 formed by the reference electrodes 138 and 139

At a step S250, microcomputer 165 performs an operation to calculate a maximum amplitude (reference maximum amplitude) in the waveform of the after-passage signal obtained from the output/input circuit 167 (the current-to-voltage converting circuit 183). The maximum amplitude of the reference after-passage signal is proportional to the first capacitance Cs1, and the first capacitance Cs1 is dependent on the dielectric constant of the oil. Therefore, the reference maximum amplitude is indicative of the dielectric constant of the oil. After S250, microcomputer 165 returns to the oil level sensing process of FIG. 9, and proceeds to a step S130.

Figure 11:
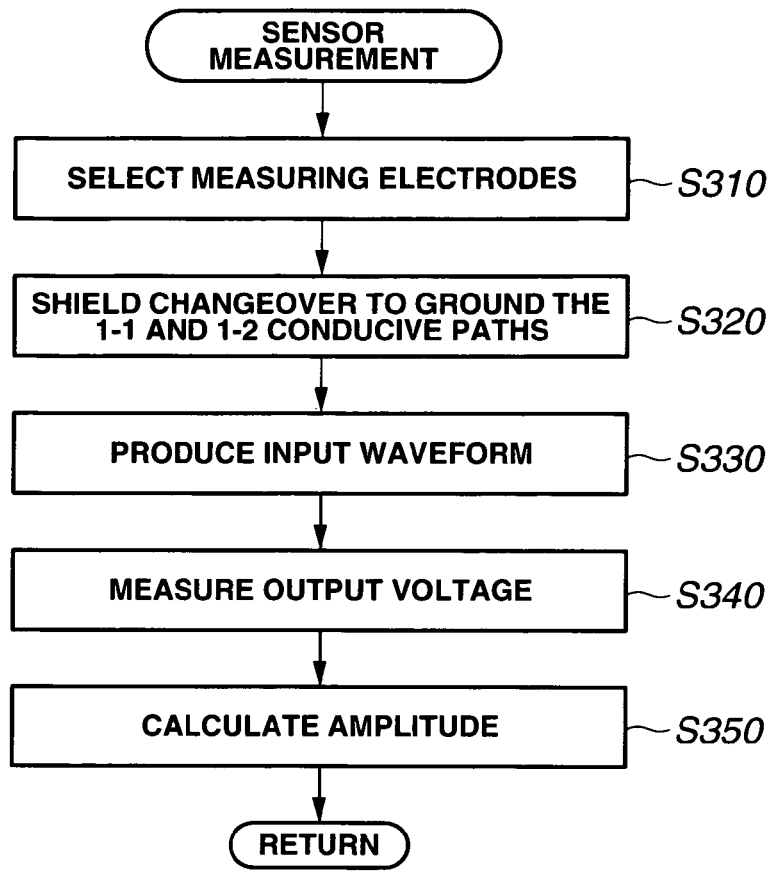
FIG. 11 is a flowchart showing a sensor measurement process performed at a step S130 of FIG. 9.

At step S130, microcomputer 165 performs an oil level measuring process shown in FIG. 11. At a first step S310 of the oil level measuring process of FIG. 11, microcomputer 165 produce the switch timing signal to select the measuring electrode pair of 2-1 and 2-2 electrodes 132 and 133 as the destination of the connection, and thereby drives the switching circuit 169 to connect the output/input circuit 167 with the measuring electrode pair.

At a step S320, microcomputer 165 produces the shield changeover timing signal to turn off the second grounding circuit 171, and thereby sets the second grounding circuit 171 to an off state to disconnect the measuring electrode pair 132 and 133 from the ground line. Moreover, microcomputer 165 produces the shield changeover timing signal to turn on the first grounding circuit 170, and thereby sets the first grounding circuit 170 to an on state to connect the 1-1 conductive path 158 and 1-2 conductive path 159 to the ground line.

Therefore, the 1-2 lead pin 159r located between the 2-1 and 2-2 lead pins 152r and 153r, as well as the 1-1 lead pin 158r, serves as a ground electrode, and thereby functions to reduce the second parasitic capacitance Cc2 formed between the 2-1 and 2-2 lead pins 152r and 153r significantly. As a result, the liquid level sensing system can sense the second capacitance Cs2 between the 2-1 and 2-2 electrodes 132 and 133 accurately by reducing the influence of the second parasitic capacitance Cc2 constituting a large part of the parasitic capacitance between the 2-1 conductive path 152 and the 2-2 conductive path 153.

At a step S330, microcomputer 165 delivers the input waveform generation command signal to the output/input circuit 167, drives the voltage dividing circuit 181, and causes the low-pass filter 182 to produce the stepwise sinusoidal signal. By so doing, the output/input circuit 167 (voltage dividing circuit 181 and low-pass filter 182) delivers the measurement signal (sinusoidal signal) to the 2-1 electrode 132 of the measuring electrode pair through the switching circuit 169.

At a step S340, microcomputer 165 performs an operation to receive a signal outputted from the output/input circuit 167 (the current-to-voltage converting circuit 183). The signal received from the output/input circuit 167 is an after-passage signal (the measurement after-passage signal) produced by causing the measurement signal (sinusoidal signal) to pass through the capacitor CP2 formed by the measuring electrodes 132 and 133

At a step S350, microcomputer 165 performs an operation to calculate a maximum amplitude (measurement maximum amplitude) in the waveform of the after-passage signal obtained from the output/input circuit 167 (the current-to-voltage converting circuit 183). The maximum amplitude of the measurement after-passage signal is proportional to the second capacitance Cs2, and the second capacitance Cs2 is dependent on the percentage of the submerged portion in the oil. Therefore, the measurement maximum amplitude is indicative of the oil level. After S350, microcomputer 165 returns to the oil level sensing process of FIG. 9, and proceeds to a step S140.

Figure 12:
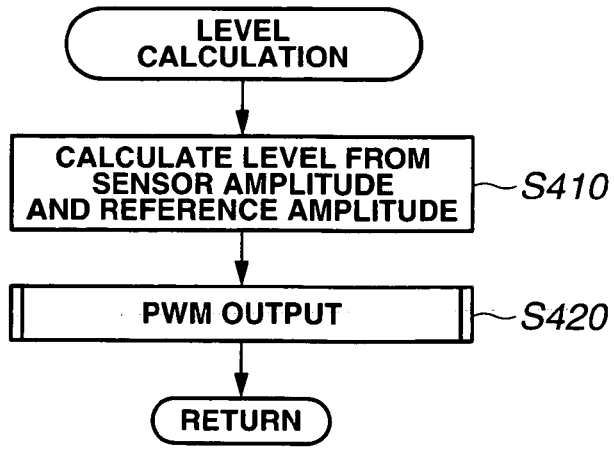
FIG. 12 is a flowchart showing a level calculating process performed at a step S140 of FIG. 9.

At step S140 of FIG. 9, microcomputer 165 performs an oil level calculating process shown in FIG. 12. At a first step S410 of FIG. 12, microcomputer 165 calculates the oil level from the reference maximum amplitude calculated at step S120 (FIG. 10) and the measurement maximum amplitude calculated at step S130 (FIG. 11). In this example, microcomputer 165 calculates the first capacitance Cs1 from the reference maximum amplitude, and the second capacitance Cs2 from the measurement maximum amplitude. Then, microcomputer 165 determines the ratio between the first and second capacitance Cs1 and Cs2, and calculates the oil level from the thus-determined ratio.

Figure 13:
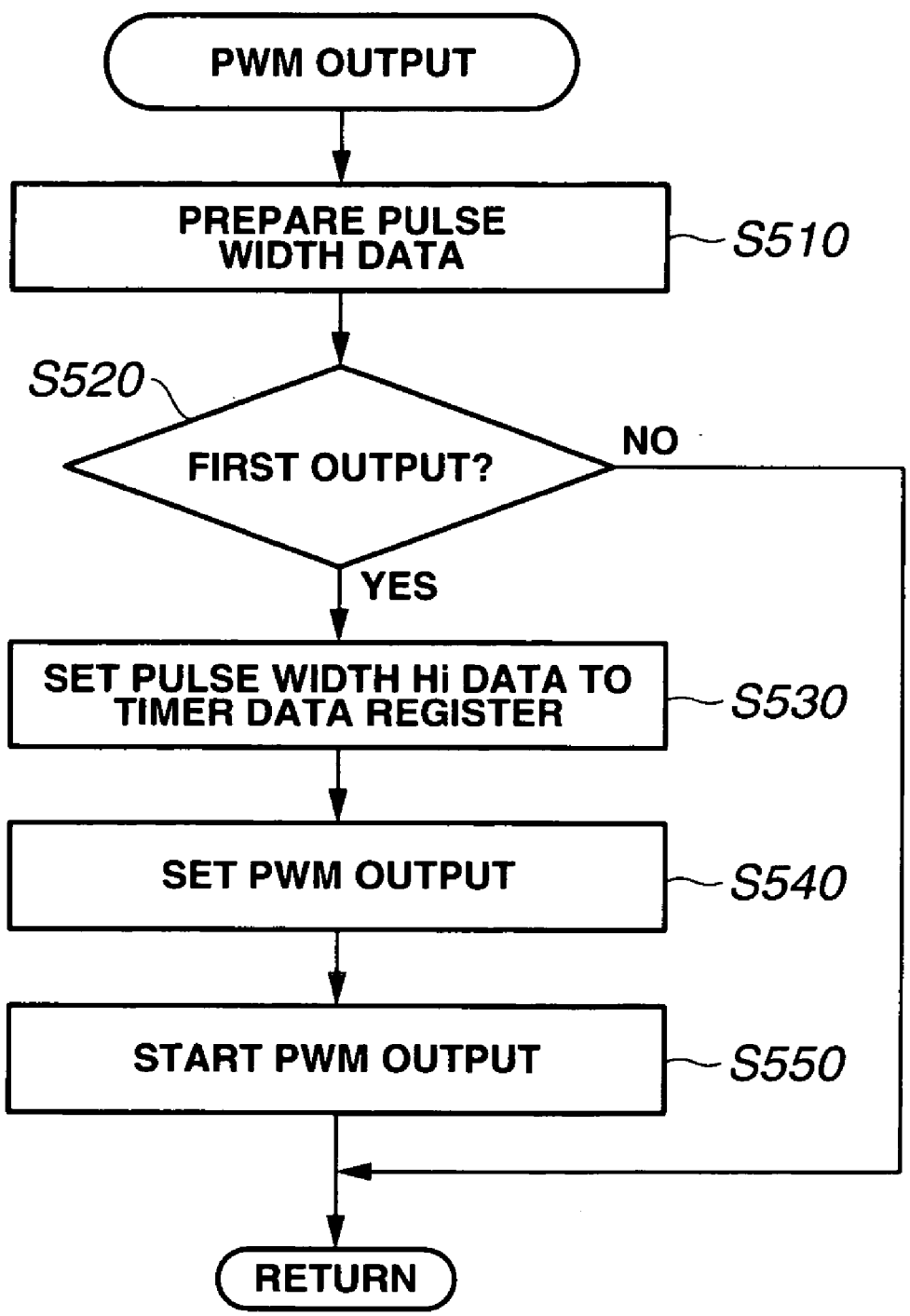
FIG. 13 is a flowchart showing a PWM output process performed at a step S420 of FIG. 12.

At a step S420, microcomputer 165 performs a PWM output process shown in FIG. 13. At a first step S510 of FIG. 13, microcomputer 165 performs an operation to produce pulse width data in accordance with the oil level calculated by the oil level calculating process. The pulse width data contains at least pulse width Hi data including a high level output time of the PWM signal, and pulse width Lo data including a low level output time of the PWM signal. At S510, the pulse width data is determined so that the high level output time increases as the oil level becomes greater.

At a step S520, microcomputer 165 determines whether the current execution is for the first output of the PWM signal or not. Then, microcomputer 165 proceeds to a step S530 in the case of YES, and terminates the process of FIG. 13 in the case of NO. At step S530, microcomputer 165 performs an operation to set the pulse width Hi data prepared at S510, to a timer register.

Then, microcomputer 165 sets the output state of the PWM signal to a high level at a step S540, and starts the output of PWM signal at a step S550. After S550, microcomputer 165 terminates the PWM output process of FIG. 13, and resumes the oil level calculating process of FIG. 12. When the output of PWM signal is started at S550, the measurement of elapsed time is started by a timer. Thereafter, when a time corresponding to the pulse width Hi data set at S530 has elapsed, a timer interrupt process is performed.

Figure 14:
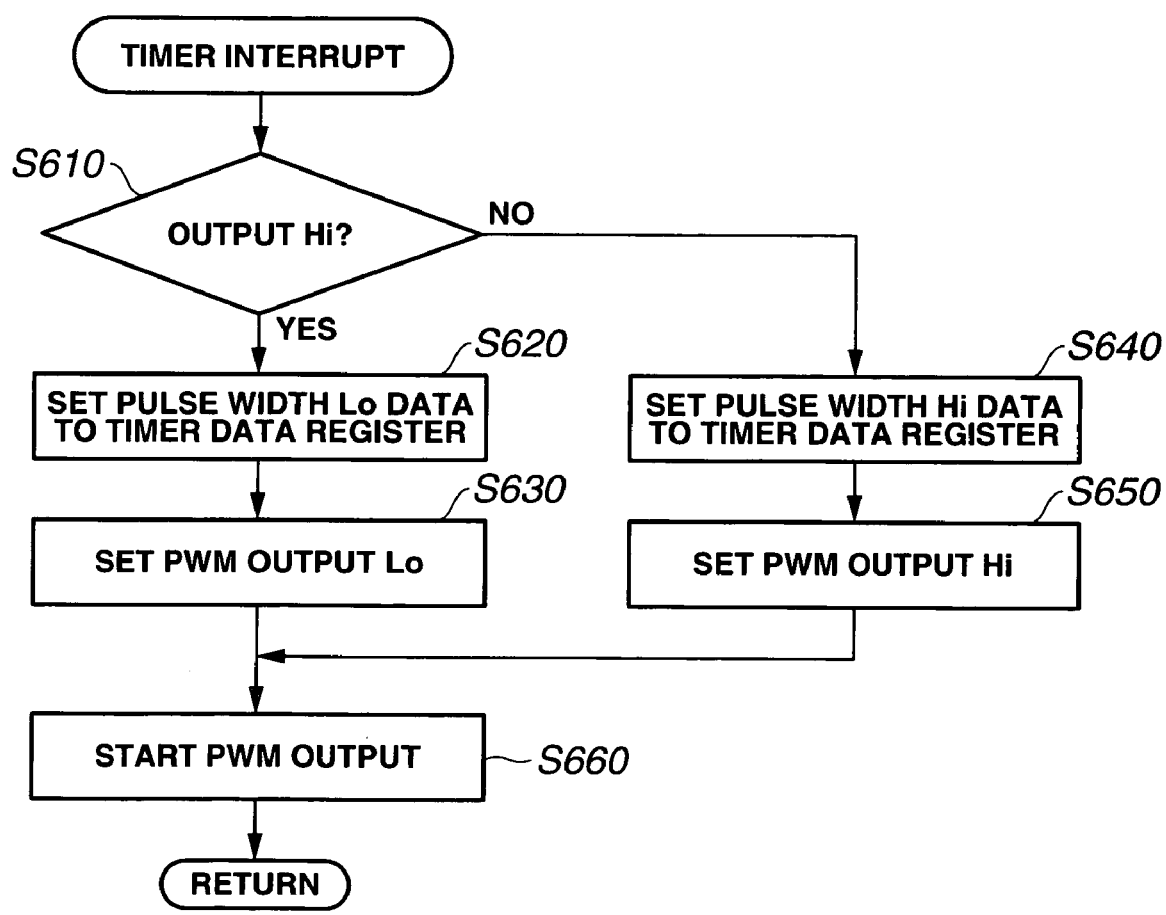
FIG. 14 is a flowchart showing a timer interrupt process performed by the sensing circuit of the liquid level sensor of FIG. 1.

FIG. 14 shows the timer interrupt process. At a first step S610 of FIG. 14, microcomputer 165 examines whether the output state of the PWM signal is set at the high level or not. From S610, microcomputer 165 proceeds to a step S620 in the case of YES (the PWM output state is set at the high level) and to a step S640 in the case of NO. At step S620, microcomputer 165 sets, to the timer register, the pulse width Lo data contained in the pulse width data prepared at step S510 of the PWM output process. Then, at a step S630, microcomputer 165 sets the output state of the PWM signal to the low level.

On the other hand, at step S640, microcomputer 165 sets, to the timer register, the pulse width Hi data contained in the pulse width data prepared at step S510 of the PWM output process. Then, at a step S650, microcomputer 165 sets the output state of the PWM signal to the high level.

After step S630 or step S650, microcomputer 165 proceeds to a step S660, and starts the operation of outputting the PWM signal. When the output of the PWM signal is started, the measurement of elapsed time is started by a timer, and the measured elapsed time exceeds a time set in the timer register, the timer interrupt process is executed. By the PWM output process of FIG. 13 and the timer interrupt process of FIG. 14, the sensing circuit 161 changes over the pulse width data (the high level output time and the low level output time) in accordance with the liquid level calculated by the level calculating process of FIG. 12. Thus, in this example, the liquid level sensor 100 notifies ECU 160 of the liquid level of oil OL in the form of PWM signal.

When the PWM output process is finished, microcomputer 165 returns to the oil level sensing control process of FIG. 9, and returns to step S120 after step S140. In this way, microcomputer 165 calculates the oil level and supplies the result of the calculation to ECU 160 by repeating the steps S110-S140 of FIG. 9.

The liquid condition sensor 100 can be fabricated in the following production process. The liquid condition sensor production process includes a preparing step of producing the film electrode board or base plate 131 shown in FIGS. 6A and 6B. In this example, the electrode board producing step includes a first substep of forming the two-layer structure of the polyimide substrate layer or film 131b, and the conductive layer 131d having the pattern of FIG. 6A formed on the polyimide substrate layer 131b, by a known etching technique to copper foil attached on a polyimide substrate film; a second substep of attaching and bonding the film 131c coated with an epoxy resin paste EP to the conductive layer 131d of the two-layer structure prepared by the first substep; a third substep of drying the thus-prepared three-layer structure in which conductive layer 131d is sandwiched between the insulating layers 131b and 131c; and a fourth substep of completing the film electrode board 131 by boring the upper through hole 131f and intermediate through holes 131e by a known technique, and boring the center through hole in each of the electrode terminals 152t, 153t, 157t, 158t and 159t as shown in FIG. 6A.

The liquid condition sensor production process further includes a setting step of setting the film electrode board 131 in the frame member 141 as shown in FIG. 7. In the illustrated example, the narrower rectangular portion 131n of the film electrode (base) board 131 is placed between the inward projections 141b and the support wall 141f, and the upper support pin 141d of frame member 141 is inserted through the upper through hole 131f of electrode board 131. Moreover, the base end 131k in the wider rectangular portion 131h of film electrode board 131 is fit in recesses of the lower support portions 141c of frame member 141, and the intermediate support pins 141e of frame member 141 are inserted through the intermediate through holes 131e of film electrode board 131, as shown in FIG. 7 and deformed to join the film electrode board 131 to frame member 141 by staking or ultrasonic bonding.

The liquid condition sensor production process further includes a connecting step of connecting the electrode board 131 with the circuit board 124. In the illustrated example, first, the frame member 141 including film electrode board 131 is fixed to the pedestal member 121 including circuit board 124. The frame member 141 and pedestal member 121 are united by fitting outward projections 141h formed in the lower portion of frame member 141 in the corresponding recesses formed in the pedestal member 121. Furthermore, the electrode terminals 153*t*, 158*t*, 157*t*, 152*t* and 159*t* are connected with circuit board 124 by the lead pins 153*r*, 158*r*, 157*r*, 152*r* and 159*r*. Upper and lower end portions of each lead pin are fixed to the corresponding terminal of electrode board 131, and the corresponding terminal of circuit board 124 by a known soldering technique.

Then, the filling member 128 is formed by filling resin in the inside space in which circuit board 124 is disposed, and the metal cover 127 is fixed to the bottom of pedestal member 121 so as to cover the filling member 128. The ring packing 125 is installed in the ring packing groove 121*p* formed in the abutment surface which is the surface of pedestal member to abut on the bottom surface of the oil tank. The liquid level sensor 100 is complete in this way.

Thus, the liquid condition sensor production process includes the preparing step of producing an electrode board such as the film electrode board 131, the setting step of setting the electrode board to a predetermined form such as the L-shaped form having the vertical zone, horizontal zone and bent zone, and the connecting step of electrically connecting the electrode board with the sensing circuit.

Although the invention has been described above by reference to certain embodiments of the invention, the invention is not limited to the embodiments described above. Modifications and variations of the embodiments described above will occur to those skilled in the art in light of the above teachings. For example, it is possible to replace the dual 2-2 electrode 133 composed of two separate electrodes 133*b* and 133*c*, with a single 2-2 electrode having only one electrode confronting the 2-1 electrode 132 to form a single capacitor.

In the illustrated embodiment, the 1-1, 1-2, 2-1 and 2-2 lead pins are arranged so as to equalize the first gap (or spacing) G1 between the 1-1 lead pin 158*r* and 1-2 lead pin 159*r* and the second gap (or spacing) G2 between the 2-1 lead pin 152*r* and 2-2 lead pin 153*r*, to each other, and to equalize the first parasitic capacitance Cc1 formed between the 1-1 lead pin 158*r* and 1-2 lead pin 159*r* and the second parasitic capacitance Cc2 formed between the 2-1 lead pin 152*r* and 2-2 lead pin 153*r*, to each other. Therefore, by using a ratio of the first and second capacitances, the capacitive liquid condition sensing apparatus can reduce adverse influence from the parasitic capacitances effectively and to sense the liquid condition accurately.

Moreover, these lead pins 152*r*, 153*r*, 158*r* and 159*r* are compactly arranged in a row so that these lead pins are influenced equally by the surroundings, and the first and second parasitic capacitances are varied equally by a change in a condition of the surroundings such as a temperature (e.g. the temperature of oil OL). Therefore, the liquid condition sensing apparatus can sense the liquid level more accurately by using the ratio between the capacitances Cs1 and Cs2, and reduce or eliminate the influence from a change in the surrounding condition.

The liquid condition sensed by the liquid condition sensing apparatus may be the level of the liquid, the dielectric of the liquid, etc. The liquid to be measured is a liquid having a dielectric constant different from the dielectric constant of air. For example, the liquid may be engine oil, gasoline (or other fuel), or machine oil.

The 1-1, 1-2, 2-1 and 2-2 electrodes may be formed in various forms. For example, these electrodes may be in the form of a conductive layer such as a copper foil on a plate-like printed board, a flexible printed board, or a film substrate; or may be in the form of metal piece shaped like a rod, a tube or a plate.

The 1-2, 1-2, 2-1 and 2-2 conductive paths may be formed in various forms. For example, these conductive paths may be partly or entirely in the form of a conductive layer on a printed circuit or wiring board or other substrate, or in the form of a rod-like lead pin, or in the form of a lead wire such as a twisted wire.

The 1-1, 1-2, 2-1 and 2-2 conductive segments may be arranged alternately. For example, the 2-1 conductive segment is located between the 1-1 and 1-2 conductive segments; and the 1-2 conductive segment is located between the 2-1 and 2-2 conductive segments.

Such an alternating arrangement of the conductive segments makes it possible to increase the distance between the 1-1 and 1-2 conductive segments, and the distance between the 2-1 and 2-2 conductive segments, without increasing the overall area occupied by these conductive segments. Therefore, the liquid condition sensing apparatus can decrease the parasitic capacitance between the 1-1 and 1-2 conductive segments and the parasitic capacitance between the 2-1 and 2-2 conductive segments, and thereby further reduce the influence by the parasitic capacitors on the measurement.

The 1-1, 1-2, 2-1 and 2-2 conductive segments may be 1-1, 1-2, 2-1 and 2-2 lead pins enclosed or buried in a material which is higher in dielectric constant than air. In this case, though the parasitic capacitance may be relatively great, the liquid condition sensing apparatus can reduce the influence of the parasitic capacitances on the measurement of the liquid condition.

The sensing circuit may include a first grounding circuit section to ground the 1-1 conductive path and the 1-2 conductive path; a second grounding circuit section to ground the 2-1 conductive path and the 2-2 conductive path; and a capacitance measuring section to measure the first capacitance in a first measuring state in which at least one of the 1-1 conductive path and 1-2 conductive path is not grounded, and the 2-1 conductive path and the 2-2 conductive path are both grounded by the second grounding section; and to measure the second capacitance in a second measuring state in which at least one of the 2-1 conductive path and 2-2 conductive path is not grounded, and the 1-1 conductive path and the 1-2 conductive path are both grounded by the first grounding section.

Therefore, in the case of the measurement of the first capacitance, the grounded 2-1 segment intervenes between the 1-1 and 1-2 segments, and thereby acts to further decrease the parasitic capacitance between the 1-1 and 1-2 segment. Moreover, this arrangement decreases a possibility of noises during the measurement of the first capacitance. Similarly, in the case of the measurement of the second capacitance, the grounded 1-2 segment intervenes between the 2-1 and 2-2 segments, and thereby acts to further decrease the parasitic capacitance between the 2-1 and 2-2 segment and to reduce noises. As a result, the influence of the parasitic capacitances is decreased, and the accuracy of the measurement is improved.

This application is based on a prior Japanese Patent Application No. 2005-195087 filed on Jul. 4, 2005, and a prior Japanese Patent Application No. 2006-135632 filed on May 15, 2006. The entire contents of these Japanese Patent Applications Nos. 2005-195087 and 2006-135632 are hereby incorporated by reference.

Although the invention has been described above by reference to certain embodiments of the invention, the invention is not limited to the embodiments described above. The scope of the invention is defined with reference to the following claims.

What is claimed is:

1. A capacitive liquid condition sensing apparatus to be submerged at least partly in a liquid, for sensing a liquid condition of the liquid, the liquid condition sensing apparatus comprising:

a first electrode pair of a 1-1 electrode and a 1-2 electrode arranged to form a first capacitance varying in accordance with a condition of the liquid;

a second electrode pair of a 2-1 electrode and a 2-2 electrode arranged to form a second capacitance varying in accordance with another condition of the liquid;

a circuit board formed with a sensing circuit to monitor the first and second capacitances and to sense the liquid condition in accordance with the first and second capacitances;

a 1-1 conductive path connecting the 1-1 electrode to the sensing circuit and including a 1-1 conductive segment;

a 1-2 conductive path connecting the 1-2 electrode to the sensing circuit and including a 1-2 conductive segment;

a 2-1 conductive path connecting the 2-1 electrode to the sensing circuit and including a 2-1 conductive segment; and a 2-2 conductive path connecting the 2-2 electrode to the sensing circuit and including a 2-2 conductive segment;

wherein the 1-1 conductive segment, the 1-2 conductive segment, the 2-1 conductive segment and the 2-2 conductive segment are arranged in a row, and extend side by side; and wherein the 2-1 conductive segment extends between the 1-1 conductive segment and the 1-2 conductive segment, and the 1-2 conductive segment extends between the 2-1 conductive segment and the 2-2 conductive segment.

2. The liquid condition sensing apparatus as claim in claim 1, wherein the sensing circuit comprises:

a first grounding section to ground the 1-1 conductive path and the 1-2 conductive path;

a second grounding section to ground the 2-1 conductive path and the 2-2 conductive path; and a capacitance measuring section to measure the first capacitance in a first measuring state in which at least one of the 1-1 conductive path and 1-2 conductive path is not grounded, and the 2-1 conductive path and the 2-2 conductive path are both grounded by the second grounding section; and to measure the second capacitance in a second measuring state in which at least one of the 2-1 conductive path and 2-2 conductive path is not grounded, and the 1-1 conductive path and the 1-2 conductive path are both grounded by the first grounding section.

3. A capacitive liquid condition sensing apparatus to be submerged at least partly in a liquid, for sensing a liquid condition, the liquid condition sensing apparatus comprising:

a first electrode pair of a 1-1 electrode and a 1-2 electrode arranged to form a first capacitance varying in accordance with a condition of the liquid;

a second electrode pair of a 2-1 electrode and a 2-2 electrode arranged to form a second capacitance varying in accordance with a condition of the liquid;

a circuit board formed with a sensing circuit to monitor the first and second capacitances and to sense the liquid condition in accordance with the first and second capacitances;

a 1-1 conductive path connecting the 1-1 electrode to the sensing circuit and including a 1-1 conductive segment;

a 1-2 conductive path connecting the 1-2 electrode to the sensing circuit and including a 1-2 conductive segment;

a 2-1 conductive path connecting the 2-1 electrode to the sensing circuit and including a 2-1 conductive segment; and a 2-2 conductive path connecting the 2-2 electrode to the sensing circuit and including a 2-2 conductive segment;

the 1-1 conductive segment, the 1-2 conductive segment, the 2-1 conductive segment and the 2-2 conductive segment being arranged in a row, and extending side by side; and the 1-1 conductive segment, the 1-2 conductive segment, the 2-1 conductive segment and the 2-2 conductive segment being arranged so that a first parasitic capacitance formed between the 1-1 conductive segment and the 1-2 conductive segment is equal to a second parasitic capacitance formed between the 2-1 conductive segment and the 2-2 conductive segment.

4. The liquid condition sensing apparatus as claimed in claim 3, wherein the 1-1 conductive path further includes a 1-1 terminal connected by soldering with the 1-1 conductive segment, and a 1-1 connecting line connecting the 1-1 electrode to the 1-1 terminal;

the 1-2 conductive path further includes a 1-2 terminal connected by soldering with the 1-2 conductive segment, and a 1-2 connecting line connecting the 1-2 electrode to the 1-2 terminal;

the 2-1 conductive path further includes a 2-1 terminal connected by soldering with the 2-1 conductive segment, and a 2-1 connecting line connecting the 2-1 electrode to the 2-1 terminal;

the 2-2 conductive path further includes a 2-2 terminal connected by soldering with the 2-2 conductive segment, and a 2-2 connecting line connecting the 2-2 electrode to the 2-2 terminal; and the 1-1, 1-2, 2-1 and 2-2 electrodes, the 1-1, 1-2, 2-1 and 2-2 connecting lines and the 1-1, 1-2, 2-1 and 2-2 terminals are all formed integrally in an electrode board.

5. The liquid condition sensing apparatus as claimed in claim 4, wherein the 1-1, 1-2, 2-1 and 2-2 electrodes, the 1-1, 1-2, 2-1 and 2-2 connecting lines and the 1-1, 1-2, 2-1 and 2-2 terminals are all formed on a single layer in the electrode board.

6. The liquid condition sensing apparatus as claimed in claim 5, wherein the 2-1 connecting line includes a roundabout portion detouring the 1-1 terminal, and extending through a region which is so located that the 1-1 terminal is located between the first electrode pair and the region.

7. The liquid condition sensing apparatus as claimed in claim 6, wherein the 1-1 connecting line includes a longitudinally extending portion extending, in a longitudinal direction of the electrode board, to connect the 1-1 electrode to the 1-1 terminal, and the 2-1 connecting line includes a longitudinally extending portion extending along the longitudinally extending portion of the 1-1 connecting line, and the roundabout portion extending, in a lateral direction of the electrode board and connecting the longitudinally extending portion of the 2-1 connecting line with the 2-1 terminal, the 1-1 terminal is located, in the longitudinal direction, between the longitudinally extending portion of the 1-1 connecting line and the roundabout portion of the 2-1 connecting line, and, in the lateral direction, between the 2-1 terminal and the longitudinally extending portion of the 2-1 connecting line.

8. The capacitive liquid condition sensing apparatus as claimed in claim 7, wherein the 1-1, 1-2, 2-1 and 2-2 terminals are arranged in a row in the lateral direction of the electrode board, and the 2-1 terminal is located, in the lateral direction, between the 1-1 and 1-2 terminals.

9. The liquid condition sensing apparatus as claimed in claim 4, wherein the electrode board is a flexible board which comprises:
- a vertical zone in which the 2-1 and 2-2 electrodes are formed;
- a horizontal zone in which the 1-1, 1-2, 2-1 and 2-2 terminals are formed; and
- a bent zone bent between the vertical zone and the horizontal zone; and
- the circuit board confronts the horizontal zone of the flexible board.

10. The liquid condition sensing apparatus as claimed in claim 4, wherein each of the conductive segments extends from a first end portion inserted into a through hole formed in a corresponding one of the terminals in the electrode board and a second end portion inserted into a corresponding one of through holes formed in the circuit board.

11. The liquid condition sensing apparatus as claimed in claim 3, wherein the 2-1 electrode and the 2-2 electrode of the second electrode pair extend side by side from respective lower portions adapted to be submerged in the liquid, to respective upper portions adapted to project above the surface of the fluid, and wherein the liquid condition sensing apparatus is a capacitive liquid level sensing apparatus for sensing a liquid level as the liquid condition, from the first capacitance between the 1-1 electrode and the 1-2 electrode of the first electrode pair and the second capacitance between the 2-1 electrode and the 2-2 electrode of the second electrode pair.

12. The liquid condition sensing apparatus as claimed in claim 11, wherein the first electrode pair is a reference electrode pair which is formed at a lower position to be submerged invariably in the liquid and which includes the 1-1 electrode that is a first reference electrode and the 1-2 electrode that is a second reference electrode arranged to form the first capacitance that is a reference capacitance invariable with the liquid level, and the second electrode pair is a measuring electrode pair which is formed at an upper lo position above the lower position and which includes the 2-1 electrode that is a first measuring electrode and the 2-2 electrode that is a second measuring electrode, arranged to form the second capacitance that is a measuring capacitance variable with the liquid level, and wherein the sensing circuit is configured to determine a ratio between the first capacitance and the second capacitance.

13. The capacitive liquid condition sensing apparatus as claimed in claim 3, wherein the 2-1 conductive segment extends between the 1-1 conductive segment and the 1-2 conductive segment, and the 1-2 conductive segment extends between the 2-1 conductive segment and the 2-2 conductive segment.

14. The capacitive liquid condition sensing apparatus as claimed in claim 13, wherein the sensing circuit of the circuit board comprises:
- a first grounding section to ground the 1-1 conductive path and the 1-2 conductive path;
- a second grounding section to ground the 2-1 conductive path and the 2-2 conductive path; and
- a capacitance measuring section to measure the first capacitance in a first measuring state in which at least one of the 1-1 conductive path and 1-2 conductive path is not grounded, and the 2-1 conductive path and the 2-2 conductive path are both grounded by the second grounding section; and to measure the second capacitance in a second measuring state in which at least one of the 2-1 conductive path and 2-2 conductive path is not grounded, and the 1-1 conductive path and the 1-2 conductive path are both grounded by the first grounding section.

15. The liquid condition sensing apparatus as claimed in claim 3, the 1-1 conductive segment, the 1-2 conductive segment, the 2-1 conductive segment and the 2-2 conductive segment are, respectively, a 1-1 lead pin, a 1-2 lead pin, a 2-1 lead pin and a 2-2 lead pin, and each of the lead pins is surrounded by a dielectric higher in dielectric constant than air.

16. The liquid condition sensing apparatus as claimed in claim 15, wherein the liquid condition sensing apparatus further comprises an electrode board integrally formed with the 1-1 electrode and the 1-2 electrode of the first electrode pair, and the 2-1 electrode and the 2-2 electrode of the second electrode pair.

17. The capacitive liquid condition sensing apparatus as claimed in claim 3, wherein the 1-1 conductive segment, the 1-2 conductive segment, the 2-1 conductive segment and the 2-2 conductive segment are arranged so that a first distance between the 1-1 conductive segment and the 1-2 conductive segment is equal to a second distance between the 2-1 conductive segment and the 2-2 conductive segment, and wherein the 2-1 electrode and the 2-2 electrode of the second electrode pair are adapted to extend vertically.

18. The liquid condition sensing apparatus as claimed in claim 17, wherein the 2-1 conductive segment extends between the 1-1 conductive segment and the 1-2 conductive segment, and the 1-2 conductive segment extends between the 2-1 conductive segment and the 2-2 conductive segment.

19. The liquid condition sensing apparatus as claimed in claim 3, wherein the liquid condition sensing apparatus comprises an electrode board extending longitudinally from a first end to a second end, and including the 1-1, 1-2, 2-1 and 2-2 electrodes, and 1-1, 1-2, 2-1 and 2-2 terminals connecting the 1-1, 1-2, 2-1 and 2-2 electrodes, respectively, to the sensing circuit, the second electrode pair is formed in the electrode board between the second end and the first electrode pair, and the 1-1, 1-2, 2-1 and 2-2 terminals are formed in the electrode board between the first end and the first electrode pair, and wherein the 1-1 conductive segment, the 1-2 conductive segment, the 2-1 conductive segment and the 2-2 conductive segment are connected, respectively, with the 1-1, 1-2, 2-1 and 2-2 terminals.

20. The liquid condition sensing apparatus as claimed in claim 19, wherein the electrode board includes a vertical zone in which the second electrode pair is formed, and a horizontal zone in which the 1-1, 1-2, 2-1 and 2-2 terminals are formed.

21. The capacitive liquid condition sensing apparatus as claimed in claim 3, wherein the 1-1 conductive segment, the 1-2 conductive segment, the 2-1 conductive segment and the 2-2 conductive segment are parallel to one another; and wherein the 1-1 conductive segment, the 1-2 conductive segment, the 2-1 conductive segment and the 2-2 conductive segment are identical in shape and size with one another and wherein the 1-1 electrode and the 1-2 electrode of the first electrode pair are formed in a first region and elongated in a lateral direction whereas the 2-1 electrode and the 2-2 electrode of the second electrode pair extend, from the first region, in a longitudinal direction perpendicular to the lateral direction.

22. The liquid condition sensing apparatus as claimed in claim 3, wherein the liquid condition sensing apparatus further comprises an electrode board extending longitudinally from a first end to a second end, and including a measuring zone in which the 1-1, 1-2, 2-1 and 2-2 electrodes are formed, and a connection zone located between the measuring zone and the first end of the electrode board, and the 1-1 conductive segment, the 1-2 conductive segment, the 2-1 conductive segment and the 2-2 conductive segment extend from the connecting zone away from the measuring zone.

23. The liquid condition sensing apparatus as claimed in claim 3, wherein the 1-1, 1-2, 2-1 and 2-2 electrodes are formed in a first region whereas the 1-1 conductive segment, the 1-2 conductive segment, the 2-1 conductive segment and the 2-2 conductive segment are arranged in the row in a second region located on one side of the first region.

* * * * *